United States Patent
Ichishi et al.

(10) Patent No.: US 6,669,101 B2
(45) Date of Patent: Dec. 30, 2003

(54) VEHICLE AIR CONDITIONER WITH AUTOMATIC AIR-CONDITIONING CONTROL HAVING LEARNING FUNCTION OF MANUAL OPERATION

(75) Inventors: Yoshinori Ichishi, Kariya (JP); Akira Ohga, Ichinomiya (JP); Takayoshi Kawai, Hoi-gun (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/265,340

(22) Filed: Oct. 4, 2002

(65) Prior Publication Data

US 2003/0066297 A1 Apr. 10, 2003

(30) Foreign Application Priority Data

Oct. 4, 2001 (JP) ........................................ 2001-309060
Oct. 4, 2001 (JP) ........................................ 2001-309130

(51) Int. Cl.$^7$ ............................. F24F 7/00; G05D 15/00
(52) U.S. Cl. ..................... 236/49.3; 236/78 D; 700/83
(58) Field of Search .............................. 236/49.3, 78 D, 236/91 C; 700/83, 276

(56) References Cited

U.S. PATENT DOCUMENTS 5,291,748 A * 3/1994 Ueda ............................. 62/179
5,727,131 A * 3/1998 Nakamura et al. ............. 395/22

FOREIGN PATENT DOCUMENTS

JP 7329539 * 12/1995 ............ B60H/1/00

* cited by examiner

Primary Examiner—William Wayner
(74) Attorney, Agent, or Firm—Harness, Dickey & Pierce, PLC

(57) ABSTRACT

In a vehicle air conditioner with an automatic control having a learning function of manual operation, when a passenger manually sets an air blowing amount in the automatic control, it is determined whether or not an air blowing amount after the manual operation is in a readily sensible area. When a change of the air amount due to the manual operation is in the readily sensible area, a reflecting degree of the manual operation reflected in an air amount control pattern is increased. For example, 100% of the manual operation is reflected in the air amount control pattern in the readily sensible area, while about tens % of manual operations is generally reflected in the air amount control pattern totally.

11 Claims, 18 Drawing Sheets

VEHICLE AIR CONDITIONER WITH AUTOMATIC AIR-CONDITIONING CONTROL HAVING LEARNING FUNCTION OF MANUAL OPERATION

CROSS-REFERENCE TO RELATED APPLICATION

This application is related to and claims priority from Japanese Patent Applications No. 2001-309060 filed on Oct. 4, 2001 and No. 2001-309130 filed on Oct. 4, 2001, the contents of which are hereby incorporated by reference.

BACKGROUND OF THE INVENTION

1. Field of the Invention

The present invention relates to a vehicle air conditioner with automatic air-conditioning control where a voltage applied to a blower motor is calculated based on a predetermined air amount control characteristic, and the blower motor is automatically controlled. Particularly, the vehicle air conditioner is a learning automatic air conditioner where the air amount control characteristic is learned and changed so that an air-conditioning control amount, manually set in an air-amount automatic control, is reflected in the next automatic air-conditioning control after the manual operation is performed.

2. Description of Related Art

In conventional vehicle air conditioners, a voltage applied to a blower motor is calculated based on a predetermined air amount control characteristic, and the blower motor is automatically controlled. Among the automatic-control air conditioners, a learning automatic air conditioner with a learning function is disclosed in JP-A-7-329539. In the learning automatic air conditioner, when a passenger manually sets an air blowing amount in an air amount automatic mode where an amount of air blown from each air outlet port is automatically controlled, the above air amount control characteristic is changed so that the manual set amount is reflected in the automatic air-conditioning control after the manual operation is performed. In the learning automatic air conditioner, each manually set amount in the automatic control mode is stored in a storage medium (memory). Then, when the storage medium is filled to its storage capacity, the manually set amounts stored in the storage medium are averaged, and the averaged amount is stored in the storage medium while the stored manually-set amounts are erased.

In the conventional learning automatic air conditioner, when the storage capacity of the storage medium is sufficiently large, an air-amount automatic control corresponding to a passenger's preference can be performed. However, in this case, an expensive storage medium having a large memory capacity is required, and production cost of the vehicle air conditioner is increased. Further, even if irregular operation is manually set, the irregular manual operation is faithfully reflected in the automatic air-conditioning control, and a regular control pattern based on the air-conditioning control characteristic is largely disturbed.

SUMMARY OF THE INVENTION

In view of the above problems, it is a first object of the present invention to provide a vehicle air conditioner with an automatic air-conditioning control having a learning function, which reduces production cost.

A second object of the present invention is to provide a vehicle air conditioner where irregular manual operation is difficult to be reflected in the automatic air-conditioning control.

According to the present invention, in a vehicle air conditioner having automatic control, a change portion learns and changes an air-conditioning control characteristic of an air-conditioning portion in accordance with a manual control value when an operation portion is manually operated in the automatic control, so that the manual control value is reflected in the next automatic control. The change portion includes determining means for determining a necessary degree of a learning control of the air-conditioning control characteristic by determining whether the manual control value is within a predetermined range, and the change portion controls a reflecting degree of the manual control value in the air-conditioning control characteristic based on the necessary degree of the learning control. Accordingly, it is compared with a case where the air-conditioning control characteristic is learned and changed without a distinction relative to all manual operation, memory capacity of a memory portion for memorizing the air-conditioning control characteristic can be made smaller. Thus, the production cost of the vehicle air conditioner can be reduced, while the passenger's preference can be effectively reflected.

Preferably, when the manual control value is in a readily sensible area in which a change of the air-conditioning state due to the manual control value is readily sensible by the passenger, the change portion increases the reflecting degree of the manual control value reflected in the next automatic control, as compared with a case where the manual control value is in an unreadily sensible area in which a change of the air-conditioning state due to the manual control value is difficult to be sensible by the passenger. Accordingly, in the readily sensible area, the manual operation can be accurately reflected in the air-conditioning control characteristic. On the other hand, irregular manual operation is difficult to be reflected. Thus, the memory capacity of the memory member can be reduced, and the cost of the vehicle air conditioner can be reduced.

The memory portion can store plural manual control values set by the operation portion through plural manual operations. In this case, when a change of the air-conditioning state due to a manual control value among the plural manual control values is readily sensible by the passenger, the change portion increases the reflecting degree of the manual control value reflected in the next automatic control, as compared with a case where a change of the air-conditioning state due to a manual control value among the plural manual control values is difficult to be sensible by the passenger. Accordingly, the same effect described above can be obtained.

Preferably, when the manual control value is in the readily sensible area, the memory portion increases a storing time for which the manual control value is stored, as compared with a case where the manual control value is the unreadily sensible area. Accordingly, the passenger's preference can be effectively reflected while the memory capacity can be reduced.

When a time for which an environmental condition for the air conditioning state is maintained is longer than a predetermined time period, the change portion increases the reflecting degree of the manual control value reflected in the next automatic control, as compared with a case where the time is shorter than the predetermined time period.

Further, in a first mode such as a face mode and bi-level mode, the change portion increases the reflecting degree of the manual control value reflected in the next automatic control, as compared with that in a second mode such as a foot mode.

On the other hand, when a difference between the manual control value and a basic control value that is stored in the memory portion is larger than a predetermined level, the change portion decreases the reflecting degree of the manual control value reflected in the next automatic control, as compared with a case where the difference is smaller than the predetermined level. Alternatively, when the difference between the manual control value and the basic control value that is stored in the memory portion is larger than a predetermined level, the change portion controls the reflecting degree of the manual control value reflected in the next automatic control at a substantially constant value. Accordingly, it is unnecessary to consider a manual control value that is greatly different from the basic control value, and the air-conditioning control characteristic can be readily approximated by a simple line, and the memory capacity can be further reduced.

When the manual control value is at a maximum value or a minimum value in an operation range of the operation portion, the change portion controls the reflecting degree of the manual control value reflected in the next automatic control at a small degree. Alternatively, when an air amount to be blown into the passenger compartment is smaller than a predetermined amount or when the air amount to be blown into the passenger compartment is smaller than the predetermined amount after the manual operation, the change portion decreases the reflecting degree of the manual control value reflected in the next automatic control.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PRESENTLY PREFERRED EMBODIMENTS

Preferred embodiments of the present invention will be described hereinafter with reference to appended drawings.

(First Embodiment)

Figure 1:
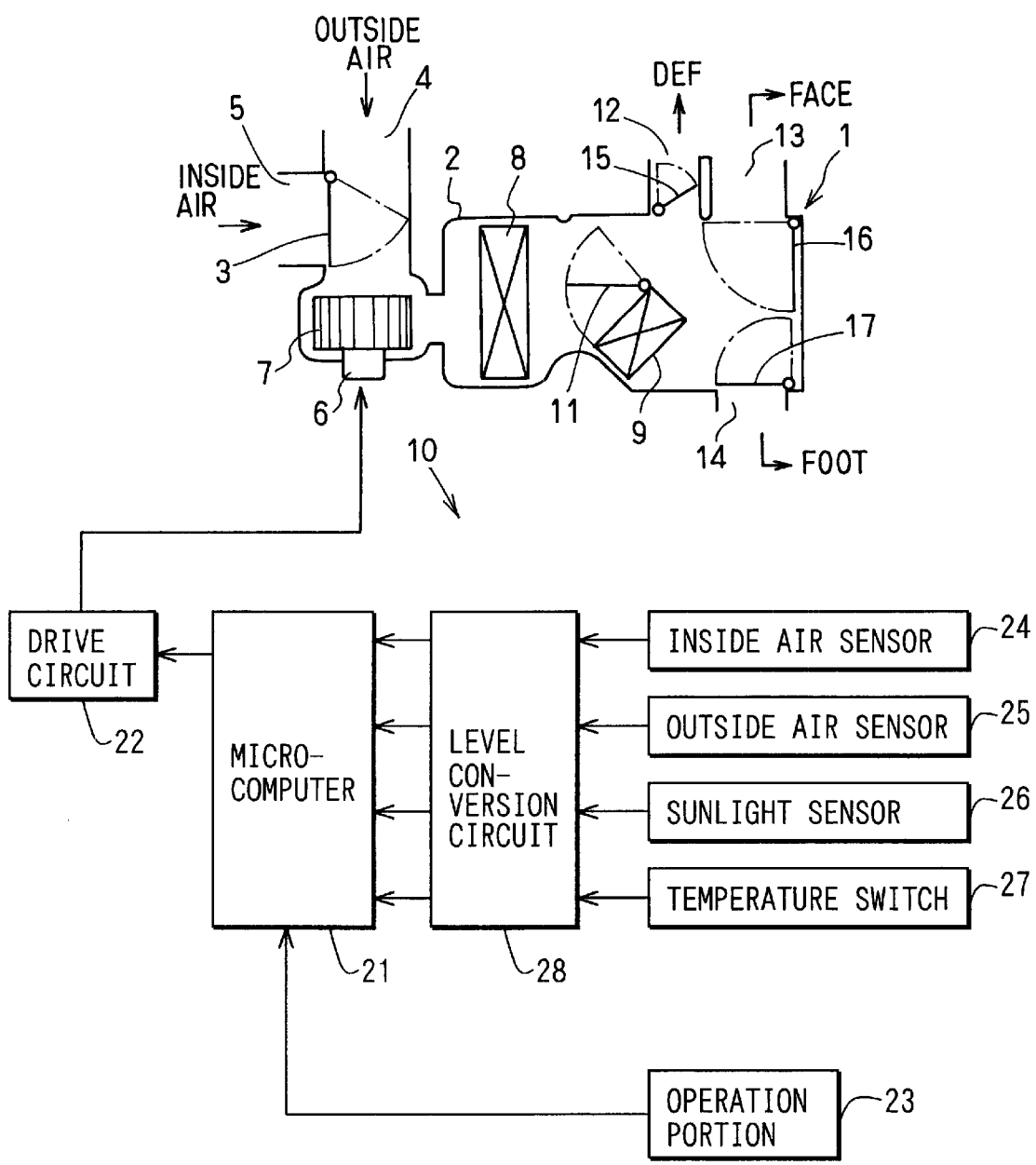
FIG. 1 is a schematic diagram showing an automatic air conditioner for a vehicle according to a first embodiment of the present invention.

An automatic air conditioner according to the first embodiment is constructed to automatically control air-conditioning performance in a passenger compartment of a vehicle including an engine. Even in the automatic air conditioner, the air-conditioning performance can be manually controlled. Specifically, in FIG. 1, an electronic control unit (air-conditioning ECU) 10 electrically controls air-conditioning components (actuators) of an air-conditioning unit 1 for performing air-conditioning operation in the passenger compartment. The air-conditioning unit 1 includes an air conditioning duct 2 for defining an air passage therein. An inside/outside air switching door 3 is provided at the most upstream side of the air conditioning duct 2 between an outside air introduction port 4 and an inside air introduction port 5. The inside/outside air switching door 3 is operated by an actuator (not shown) such as a servomotor, for selecting a flow amount ratio of inside air to outside air, to be introduced into the air conditioning duct 2. A centrifugal fan is disposed at a downstream side of the inside/outside air switching door 3. The centrifugal blower includes a blower motor 6, and a centrifugal fan 7 driven and rotated by the blower motor 6. The centrifugal fan 7 sucks air into the air conditioning duct 2 and blows the sucked air to a downstream side in the air conditioning duct 2. A refrigerant evaporator 8 and a heater core 9 are provided at a downstream side of the centrifugal fan 7.

The refrigerant evaporator 8 in a refrigerant cycle is a cooling heat exchanger for cooling air blown by the centrifugal fan 7. Here, the refrigerant cycle includes a refrigerant compressor, a refrigerant condenser, a receiver, an expansion valve, and the like. Here, rotational motive power of an engine is transmitted to the refrigerant compressor by turning on a solenoid clutch (not shown), and operation of the refrigerant cycle is started.

The heater core 9 is a heating heat exchanger for heating air passing through the heater core 9 using engine cooling water (hot water) circulated into the heater core 9. An air mixing door (A/M door) 11 is disposed at an upstream side of the heater core 9, and its open degree is adjusted by an actuator such as a servomotor. Thus, a flow amount ratio of air passing through the heater core 9 to air bypassing the heater core 9 is adjusted by the air mixing door 11, thereby controlling a temperature of air to be blown into the passenger compartment from air outlet ports provided on the air conditioning duct 2 at the most downstream side.

Specifically, a defroster air outlet port 12, a face air outlet port 13 and a foot air outlet port 14 are provided on the air conditioning duct 2 at the most downstream side. A defroster switching door 15, a face switching door 16 and a foot switching door 17 are provided at upstream sides of the defroster air outlet port 12, the face air outlet port 13 and the foot air outlet port 14, respectively. Each of the switching doors 15–17 is driven by an actuator such as a servomotor (not shown), and the temperature-controlled air is blown into the passenger compartment in an air outlet mode such as a defroster mode (DEF mode), a face mode (FACE mode), a bi-level mode (B/L mode), a foot mode (FOOT mode), a foot-defroster mode (F/D mode). In the defroster mode, conditioned air is blown toward a windshield of the vehicle. In the face mode, conditioned air is mainly blown toward the upper body portion of the passenger in the passenger compartment. In the bi-level mode, conditioned air is blown toward both of the upper portion of the passenger and the foot area of the passenger in the passenger compartment. In the foot mode, conditioned air is mainly blown toward the foot area of the passenger in the passenger compartment. Further, in the foot-defroster mode, conditioned air is blown toward the windshield while being blown toward the foot area of the passenger in the passenger compartment.

The air-conditioning ECU 10 includes a microcomputer 21 constructed by a central processing unit (CPU), a read only memory (ROM), a random access memory (RAM), a stand-by RAM, an input/output port (I/O port), an analog-digital conversion circuit (A/D conversion circuit) and the like (they are not shown). Here, an electrical erasable programmable ROM (EEPROM) may be provided in place of the ROM. An air blowing amount of the centrifugal fan 7, that is, a voltage applied to the blower motor 6 is electrically controlled by a blower driving circuit 22, based on a control signal output from the microcomputer 21. The stand-by RAM is a RAM for storing (performing a backup of) learned values of passenger's preferences even when an ignition switch (IG) is turned off, and is directly energized by a battery even when IG is turned off. Further, the microcomputer 21 includes a backup power source for energizing the stand-by RAM for a short time even when the battery is removed.

Signals are input to an input circuit of the microcomputer 21 from an operation portion (air-conditioning operation panel) 23. The operation portion 23 includes a manual inside/outside air selecting switch, a manual air-outlet mode selecting switch, a manual air blowing-amount setting switch and the like. The manual inside/outside air selecting switch is for switching any one of an inside air circulation mode and an outside air introduction mode. On the other hand, the manual air-outlet mode selecting switch is for switching any one of the defroster mode, the face mode, the B/L mode, the foot mode and the F/D mode. Further, environmental conditions relative to the air-conditioning operation in the passenger compartment of the vehicle are input to the microcomputer 21. That is, signals from an inside air temperature sensor 24, an outside air temperature sensor 25, a sunlight sensor 26 and a post evaporator temperature sensor (not shown) are input to the microcomputer 21, through a level conversion circuit 28. The analog sensor signals are converted to digital sensor signals, and the converted digital sensor signals are input to the microcomputer 21. The inside air temperature sensor 24 is for detecting an air temperature inside the passenger compartment, and the outside air temperature sensor 25 is for detecting an air temperature outside the passenger compartment. The sunlight sensor 26 is for detecting a sunlight amount entering into the passenger compartment.

A passenger's preference temperature (set temperature) in the passenger compartment is input by a temperature setting switch 27 for setting an air temperature in the passenger compartment at a desired temperature. A signal from the temperature setting switch 27 is level-converted by the level conversion circuit 28, and the level-converted signal is input to the microcomputer 21. The temperature setting switch 27 includes an air temperature up switch and an air temperature down switch. When the air temperature up switch is pushed one time, a signal for increasing the air temperature by one level (e.g., 0.5° C.) is input to the input circuit of the microcomputer 21 from the air temperature up switch. Similarly, when the air temperature down switch is pushed one time, a signal for decreasing the air temperature by one level (e.g., 0.5° C.) is input to the input circuit of the microcomputer 21 from the air temperature down switch. The operation portion 23 further includes an air amount up switch and an air amount down switch (they are not shown) for manually setting an amount of air blown into the passenger compartment. When the air amount up switch is pushed one time, a signal for increasing the blower voltage (voltage applied to the blower motor 6) by one level (e.g., 0.25V) is input to the input circuit of the microcomputer 21 from the air amount up switch. Similarly, when the air amount down switch is pushed one time, a signal for reducing the blower voltage by one level (e.g., 0.25V) is input to the input circuit of the microcomputer 21 from the air amount down switch.

Figure 2A:
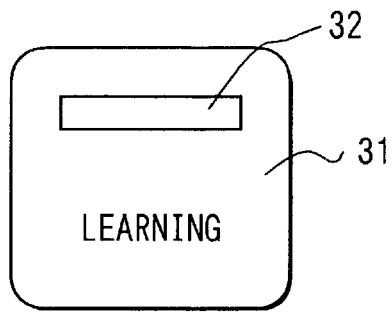
FIG. 2A is a plan view showing a learning mode switch according to the first embodiment.
Figure 2B:
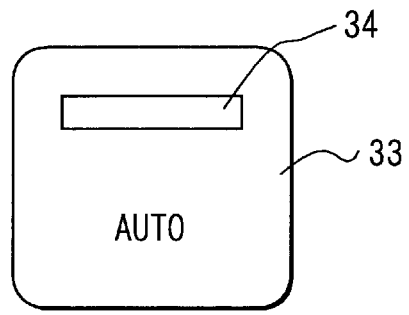
FIG. 2B is a plan view showing an automatic operation switch according to the first embodiment.

As shown in FIG. 2A, the operation portion 23 includes a push-button switch (learning switch) 31 having a learning mode indicator 32. The learning switch 31 is for commanding a learning mode where passenger's manual operation is reflected in control characteristics. The learning mode indicator 32 includes a light emitting diode (LED) and the like for indicating a learning mode state by lighting the LED. The learning switch 31 is disposed at a position where the learning switch 31 can be readily operated and can be readily seen by the driver. As shown in FIG. 2B, the operation portion 23 includes a push-button switch (automatic operation switch) 33 having an automatic operation indicator 34. The automatic operation switch 33 is for setting automatic control where each actuator of the air-conditioning unit 1 is automatically controlled based on a predetermined control characteristic such as a blower voltage control characteristic, a blowing temperature characteristic, an inside/outside air introduction characteristic and an air outlet mode control characteristic. The automatic operation indicator 34 includes a LED and the like for indicating an automatic control state by lighting the LED.

When the automatic operation switch 33 is pushed, an automatic control mode such as an air amount automatic control is performed base on the predetermined control characteristic such as the air amount control characteristic, and the automatic operation indicator 34 is turned on. At this time, when the passenger operates the manual operation switch, the automatic control mode is released to perform a manual control mode set by the passenger, and the automatic operation indicator 34 is turned off. When the automatic operation switch 33 is again pushed, the automatic control mode is again performed, and the automatic operation indicator 34 is again turned on. For example, when the automatic control mode is released by manually operating the air amount control switch, the other automatic control such as the inside/outside air mode control, the air temperature control, the air outlet mode control and the like can be maintained as it is.

Figure 3:
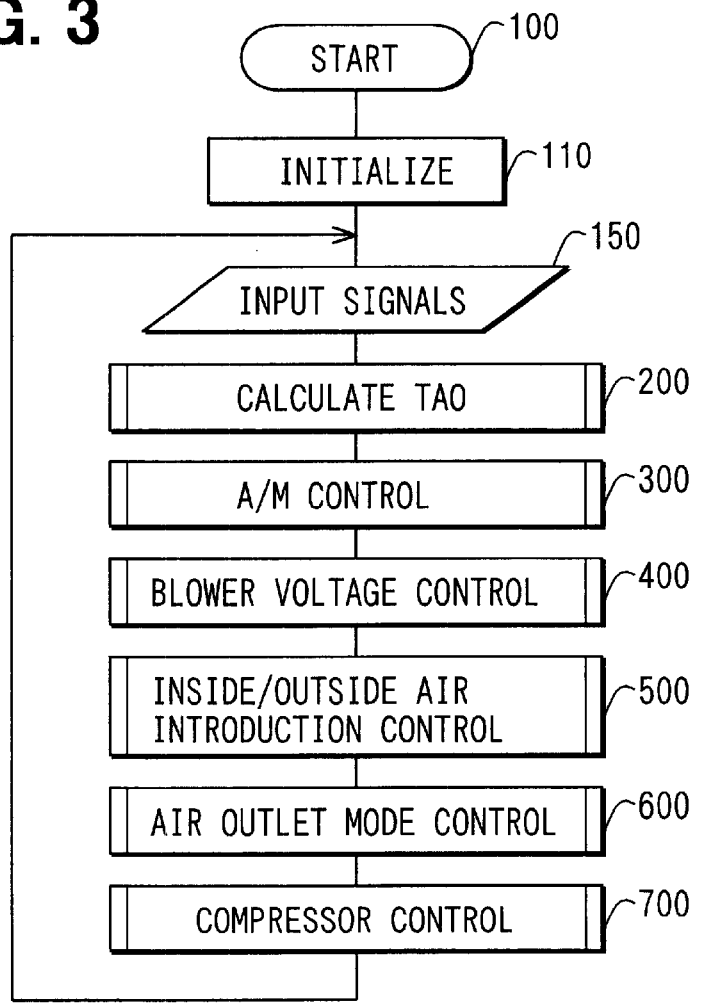
FIG. 3. is a flow diagram showing a basic control of the automatic air conditioner according to the first embodiment.

Next, a control method of the vehicle air conditioner having the automatic controlling operation according to the first embodiment will be described with reference to FIGS. 1–8. FIG. 3 shows a basic control of the vehicle air conditioner. In FIG. 3, at step S100, the microcomputer 21 starts control operation after the IG is turned on. At step S110, conversion values, flags and the likes are initialized. At step S150, sensor signals relative to environmental conditions are input to the microcomputer 21 from the inside air temperature sensor 24, the outside air temperature sensor 25, the sunlight sensor 26 and the post evaporator temperature sensor, and operation signals relative to operation switch states are input to the microcomputer 21 from the operation portion 23 and the temperature setting switch 27. Further, operation signals are input to the microcomputer 21 from the learning switch 31 and the automatic operation switch 33.

At step S200, a target blowing temperature TAO of air blown into the passenger compartment is calculated by the following formula (1) based on the signals relative to the environmental conditions input at step S150.

$$TAO = KSET \times TSET - KR \times TR - KAM \times TAM - KS \times TS + C \qquad (1)$$

wherein, each of KSET, KR, KAM and KS is a coefficient, and C is a constant. TSET is a set temperature for the passenger compartment (inside air temperature) set by the temperature setting switch 27, and TR is an inside air temperature detected by the inside air temperature sensor 24. TAM is an air temperature outside the passenger compartment (outside temperature) detected by the outside air temperature sensor 25, and TS is an amount of sunlight radiated into the passenger compartment detected by the sunlight sensor 26.

Step S300, an open degree of the A/M door 11 is calculated by the following formula (2) in correspondence to the target blowing temperature TAO in an automatic air-conditioning control mode. The A/M door 11 is controlled to be operated to the calculated open degree, thereby automatically controlling the temperature of air blown into the passenger compartment from the air outlet ports 12–14. However, since a desired blowing temperature is changed for every passenger, it is difficult to determine the desired air blowing temperature uniformly for every passenger.

Therefore, manual operation of the passenger is stored, and the air temperature control characteristic can be changed so that the stored manual operation is reflected in the next air temperature automatic control after the manual operation is performed.

$$SW = [(TAO - TE)/(TW - TE)] \times 100(\%) \qquad (2)$$

wherein, TAO is the target blowing temperature calculated at step S200, TE is the post evaporator temperature (air temperature directly at a downstream side of the evaporator 8) detected by the post evaporator temperature sensor, and TW is a temperature of engine cooling water detected by a water temperature sensor (not shown).

At step S400, an amount of air blown by the centrifugal fan 7 is calculated in the automatic mode, and the amount of air blown into the passenger compartment is controlled by controlling the rotation speed of the centrifugal fan 7 connected to the blower motor 6 through the blower driving circuit 22. That is, at step S400, a blower voltage applied to the blower motor 16 is controlled through the blower driving circuit 22 so that the amount of air blown into the passenger compartment is controlled. However, a desired air blowing amount is changed for every passenger, and is difficult to be uniformly determined. Therefore, in the first embodiment, manual setting value of a passenger is stored in the microcomputer 21, and a preference of the passenger is reflected in air blowing control characteristics in a learning control mode where the manual setting value of a passenger is reflected in the air amount control after the manual setting is performed. The learning mode will be described later in detail.

At step S500, for example, an introduction amount ratio of inside air to outside air, to be controlled by the inside/outside air switching door 3, is calculated based the target blowing temperature TAO in the automatic mode. That is, an inside/outside air mode is determined among the inside air circulation mode, the outside air introduction mode and an inside/outside air introduction mode. Here, when the inside air circulation mode is manually selected, the inside/outside air switching door 3 is controlled to set the selected inside air circulation mode. Further, the inside/outside air mode preferred by the passenger is learned in the manual operation of the passenger, and the preference of the passenger may be reflected in the inside/outside air control characteristics. At step S600, for example, the air outlet mode is calculated in accordance with the target blowing temperature TAO in the automatic mode. That is, the air outlet mode is determined among the face mode, the B/L mode, the foot mode, F/D mode and the defroster mode. Each operation of the mode switching doors 15–17 is controlled so that the determined air outlet mode can be set. When the air outlet mode is manually selected, each of the mode switching doors 15–17 is controlled so that the manually selected air outlet mode can be set. Further, the air outlet mode preferred by the passenger can be learned in the manual operation of the passenger, and the preference of the passenger may be reflected in the air-outlet mode control characteristics.

At step S700, the compressor of the refrigerant cycle is controlled in the automatic mode. For example, when the post evaporator temperature TE detected by the post evaporator temperature sensor is reduced equal to or lower than 3° C., a solenoid clutch is controlled to be disconnected to the compressor. Further, when the post evaporator temperature TE is increased equal to or higher than 4° C., the solenoid clutch is controlled to be connected to the compressor. Here, the post evaporator temperature TE is an air temperature directly at the downstream side of the evaporator 8, or a fin temperature of the evaporator 8. Thereafter, the control operation is returned to step S150, and steps S150–S700 are repeated to control air-conditioning performance in the passenger compartment.

Figure 7A:
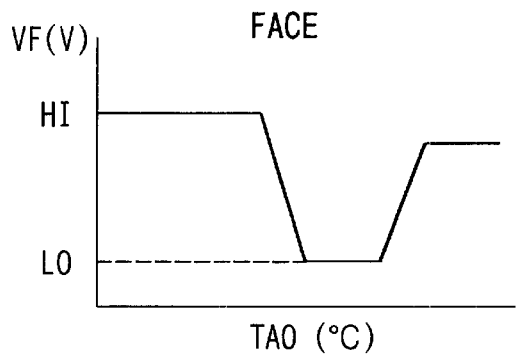
FIGS. 7A–7E are graphs showing original blower-voltage control patterns corresponding to a target blowing temperature (TAO) in the face mode, in the B/L mode, in the foot mode, in the F/D mode and in a defroster (DEF) mode, respectively, according to the first embodiment.

Next, a blower voltage control for electrically controlling the voltage applied to the blower motor in accordance with the air outlet mode will be described in detail. After step S300 shown in FIG. 3 is performed, at step S410 shown in FIG. 4, it is determined whether or not the present air outlet mode is the face mode. In the face mode, conditioned air (mainly cool air) is blown to the upper body portion of the passenger from the face air outlet port 13. When the face mode is determined to be set at step S410, it is determined whether or not an air blowing amount is manually set at step S411 in FIG. 5A. When the determination at step S411 is YES, that is, when the air blowing amount is manually set at step S411, a blower voltage control map in the face mode shown in FIG. 7A is changed at step S412, and a blower voltage VF is calculated at step S413. Then, the blower voltage VF is output to the blower motor 6 through the driving circuit 22 at step S460 shown FIG. 4. Thereafter, the control step proceeds to step S500 shown in FIG. 3.

Figure 4:
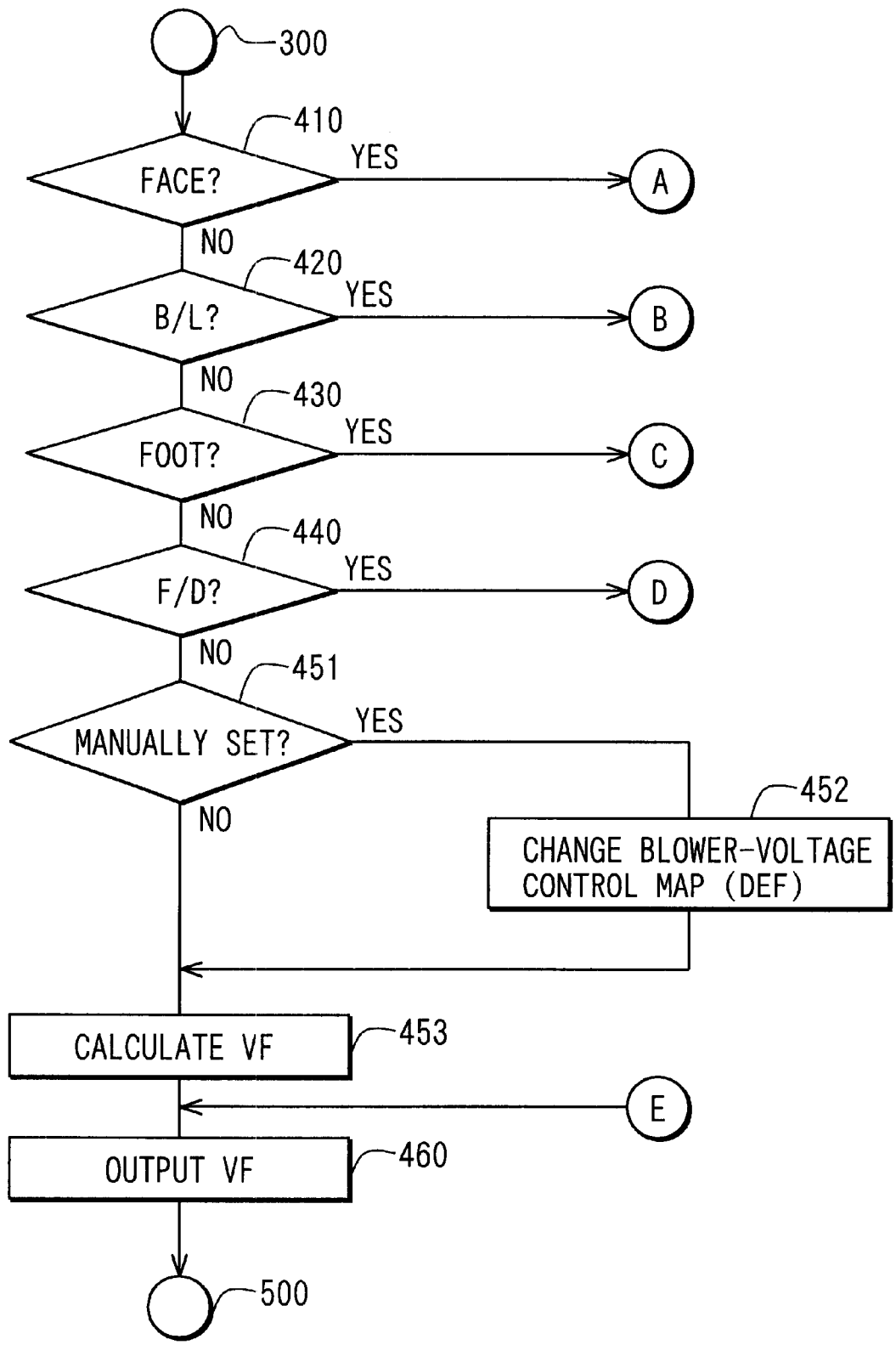
FIG. 4 is a flow diagram showing a blower-voltage control in the basic control operation shown in FIG. 3.
Figure 5A:
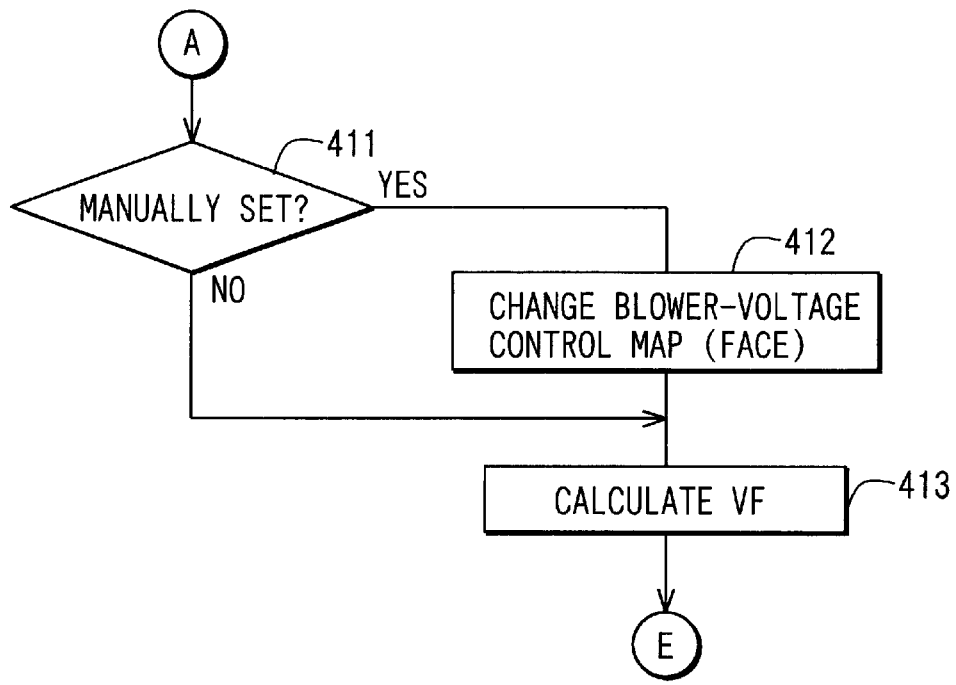
FIG. 5A is a flow diagram showing a detail blower-voltage control operation in a face mode shown in FIG. 4.
Figure 5B:
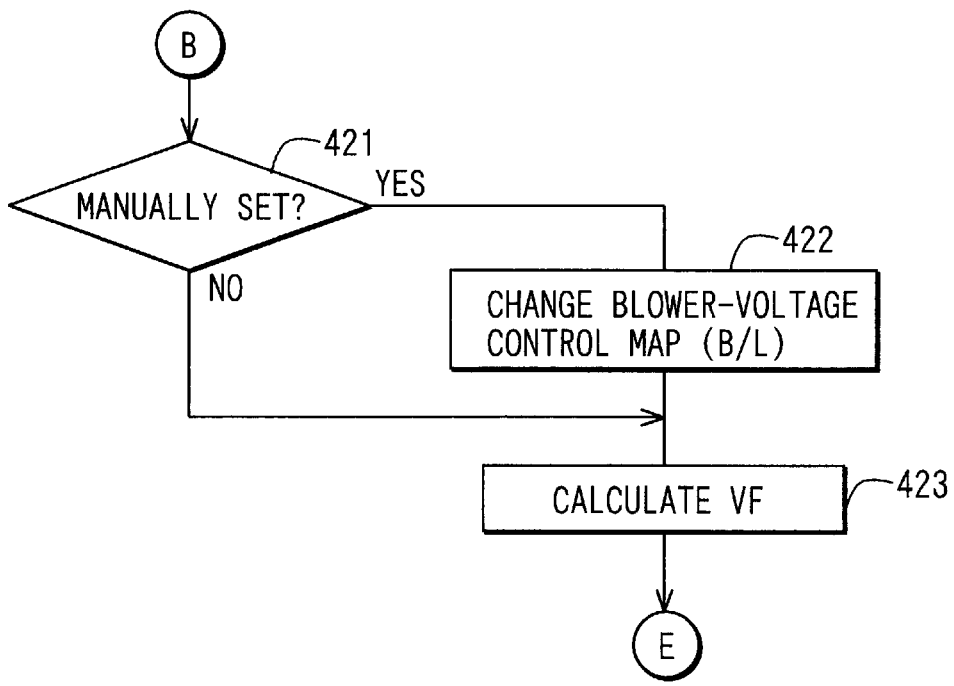
FIG. 5B is a detail blower-voltage control operation in a bi-level (B/L) mode shown in FIG. 4.
Figure 6A:
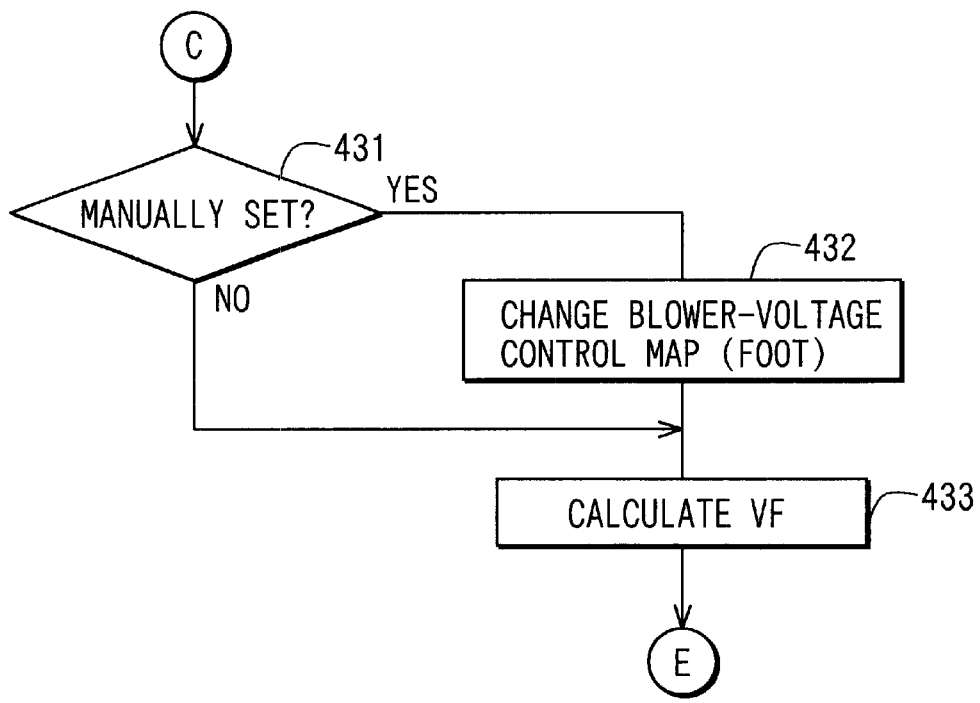
FIG. 6A is a flow diagram showing a detail blower-voltage control operation in a foot mode shown in FIG. 4.
Figure 6B:
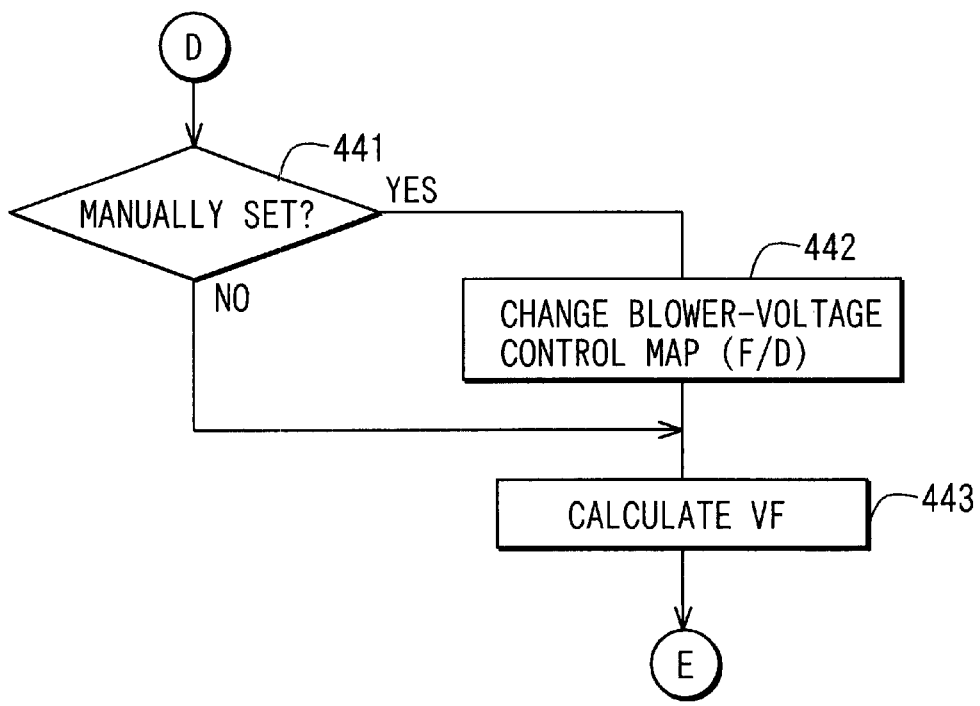
FIG. 6B is a flow diagram showing a detail blower-voltage control operation in a foot/defroster (F/D) mode shown in FIG. 4.
Figure 7B:
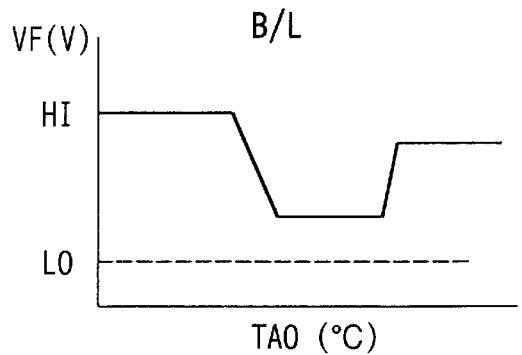

When the present air outlet mode is not the face mode at step S410 in FIG. 4, it is determined whether or not the present air outlet mode is the B/L mode at step S420 in FIG. 4. In the B/L mode, conditioned air is blown to the upper body portion of the passenger from the face air outlet port 13, and is blown to the foot portion of the passenger from the foot air outlet port 14. When the B/L mode is determined to be set, it is determined whether or not the air blowing amount is manually set at step S421 in FIG. 5B. When the determination at step S421 is YES, a blower voltage control map in the B/L mode shown in FIG. 7B is changed at step S422, and a blower voltage VF in the B/L mode is calculated at step S423. Then, the blower voltage VF is output to the blower motor 6 through the driving circuit 22 at step S460 shown in FIG. 4. Thereafter, the control step proceeds to step S500 shown in FIG. 3.

Figure 7C:
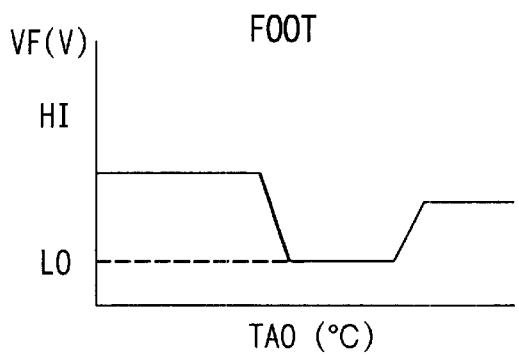

When the determination at step S420 in FIG. 4 is NO, it is determined whether or not the present air outlet mode is the foot mode at step S430 in FIG. 4. In the foot mode, conditioned air is blown to the foot portion of the passenger from the foot air outlet port 14. When the B/L mode is determined to be set, it is determined whether or not an air blowing amount is manually set at step S431 shown in FIG. 6A. When the determination at step S431 is YES, a blower voltage control map in the foot mode shown in FIG. 7C is changed at step S432, and the blower voltage VF is calculated at step S433. Then, the blower voltage VF is output to the blower motor 6 through the driving circuit 22 at step S460 shown in FIG. 4. Thereafter, the control step proceeds to step S500 shown FIG. 3.

Figure 7D:
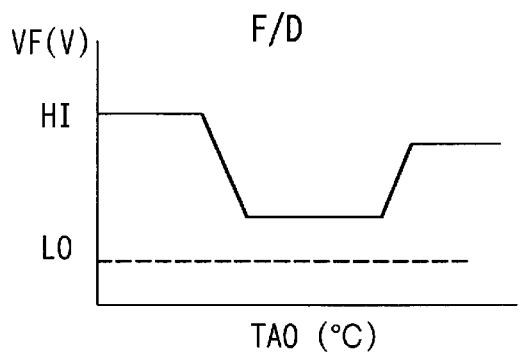
Figure 7E:
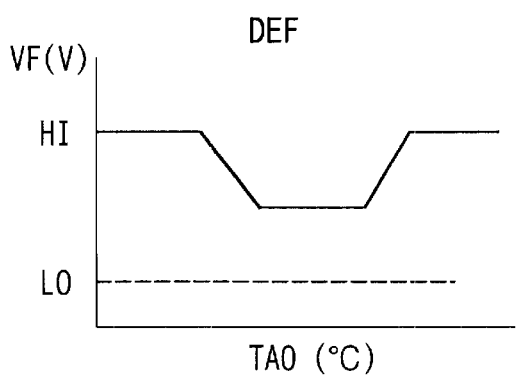

When the determination at step S430 in FIG. 4 is NO, it is determined whether or not the present air outlet mode is the F/D mode at step S440 in FIG. 4. In the F/D mode, conditioned air is blown to an inner surface of the windshield from the defroster air outlet port 12, and is blown to the foot portion of the passenger from the foot air outlet port 14. When the F/D mode is determined to be set, it is determined whether or not an air blowing amount is manually set at step S441 shown in FIG. 6B. When the determination at step S441 is YES, a blower voltage control map in the F/D mode shown in FIG. 7D is changed at step S442, and a blower voltage VF is calculated at step S443. Then, the blower voltage VF is output to the blower motor 6 through the driving circuit 22 at step S460 shown in FIG. 4. Thereafter, the control step proceeds to step S500 shown FIG. 3. When the determination is NO at all steps S410, S420, S430, S440, the air outlet mode is determined to be the defroster mode. In the defroster mode, conditioned air is blown to the inner surface of the windshield from the defroster air outlet port 12. Then, it is determined whether or not an air blowing amount is manually set at step S451. When the determination at step S451 is YES, a blower voltage control map in the defroster mode shown in FIG. 7E is changed at step S452, and the blower voltage VF is calculated at step S453. Then, the blower voltage VF is output to the blower motor 6 through the driving circuit 22, at step S460 shown FIG. 4. Thereafter, the control step proceeds to step S500 shown in FIG. 3.

Next, a learning change control in the learning mode according to the first embodiment will be described. When the air blowing amount is manually set in an air amount automatic mode, the automatic operation indicator 34 is turned off, and the voltage applied to the blower motor 6 is controlled to become the desired blower voltage VF. When 3–5 seconds passes after ending the manual operation, a buzzer is sounded while the learning mode indicator 32 is made to flicker to inform the passenger whether or not the blower voltage control characteristic is allowed to be changed in accordance with the manual operation of the passenger. When the passenger wants to prohibit the learning change, the above learning change can be prevented by pushing the learning switch 31 within two seconds after starting the indication of the learning mode indicator 32 for the passenger. When the learning switch 31 is pushed after two seconds after starting the indication of the learning mode indicator 32 for the passenger, the blower voltage control characteristic of the blower voltage control map described later is changed in accordance with the manual operation of the passenger. Accordingly, when the passenger manually sets the air blowing amount to a passenger's preference air blowing amount, the blower voltage control characteristic in the air-amount automatic mode can be changed to a characteristic in which the passenger's preference is reflected, after a predetermined time (e.g., five seconds) passes after the manual operation.

Figure 8:
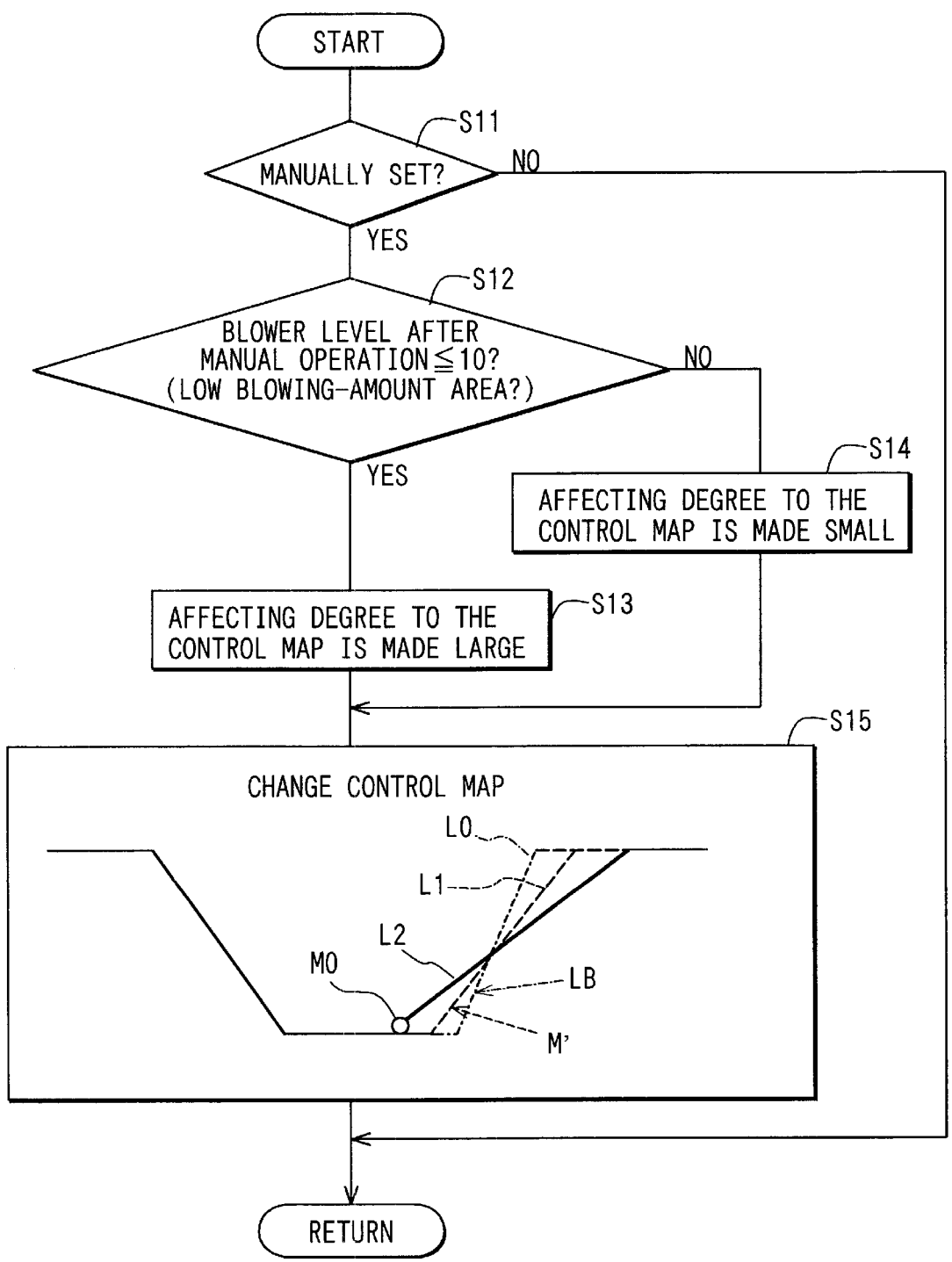
FIG. 8 is a flow diagram showing a learning-change control for an air amount control map (blower voltage control map), according to the first embodiment.

Next, the learning change control of the blower voltage control map will be described in detail. In FIG. 8, at step S11, it is determined whether or not the passenger manually sets the air blowing amount in the air amount automatic mode where a voltage applied to the blower motor 6 is automatically controlled in accordance with the blower voltage control map. That is, it is determined whether or not the passenger increases the blower voltage by one level (0.25V) or more by pushing the air amount up switch, or it is determined whether or not the passenger reduces the blower voltage by one level (0.25V) or more by pushing the air amount down switch. When the determination at step S11 is YES, that is, when it is determined that the passenger manually sets the air blowing amount, it is determined whether or not the air blowing level after the manual operation is in a readily sensible area at step S12. In the readily sensible area, for example, the air blowing amount is small, and the air blowing temperature is approximate 25° C. Further, in the readily sensible area, an air amount change (air-conditioning state change) is readily sensible by the passenger. For example, at step S12, it is determined whether or not the air blowing level after the manual operation is set equal to or lower than a predetermined level (e.g., 10 levels).

When the determination at step S12 is YES, that is, when the air blowing level after the manual operation is in the readily sensible area, it is determined that the above manually-set air amount is largely affected to the blower voltage control map at step S13. That is, an effecting degree (necessary degree) of the manual operation to the control pattern is larger. Then, at step S15, the blower voltage control map is formed so that the air amount control pattern is changed to the solid line L2 passing through an operation point M0 where the air amount change is readily sensible for the passenger. When the determination at step S12 is N0, that is, when the air blowing level after the manual operation is in an unreadily sensible area, it is determined that the above manually-set air amount is not largely affected to the blower voltage control map at step S14. That is, the affecting degree of the manual operation affected to the blower voltage control map is small. Then, at step S15, the blower voltage control map is formed so that the air amount control pattern is changed to the broken line L1 where the air amount change is difficult to be sensible by the passenger. Here, the chain line L0 represents a basic air-amount control pattern, that is, the air-amount control pattern before being changed. Generally, several ten % of manual operation is reflected in the air amount control. However, when the air amount is not in the low air amount area, the air amount control characteristic of the blower voltage control map is changed by 20–50% of the manual operation amount. When the air amount is in the low air amount area, the air amount control characteristic of the blower voltage control map is changed by 100% of the manual operation amount.

When the air blowing amount manually set by the passenger is lower than a predetermined amount, it can be determined that the air blowing amount is in the readily sensible area. Further, when it is determined that the air blowing amount is in the readily sensible area, it can determine that the manually set air blowing amount is data having a large affecting degree relative to the blower voltage control map. In this case, the blower voltage control map is changed to pass through the manually set air blowing amount set by the passenger. On the other hand, when the air blowing amount manually set by the passenger is not lower than the predetermined amount, it can be determined that the air blowing amount is in the unreadily sensible area. Further, when it is determined that the air blowing amount is in the unreadily sensible area, it can determine that the manually set air blowing amount is data having a small affecting degree relative to the blower voltage control map. In this case, it is unnecessary to change the control pattern of the blower voltage control map to the manually set air blowing amount by 100%. That is, in this case, the blower voltage control map is changed to a control pattern that is linearly approximated to the manually set air blowing amount by a ratio in a range of 20–50%. Accordingly, when it is determined that the air amount change is in the unreadily sensible area, a free degree for setting a straight line approximating plural operation points manually set by the passenger or a simple combination of the simple straight line is readily set. Thus, the stored capacity can be reduced by the simple approximating method due to the simple lines.

As described above, in the automatic air conditioner according to the first embodiment, as the passenger performs the manual operation in the more readily sensible area, the more manual operation is reflected in the air amount automatic control. Therefore, the air amount control characteristic can be faithfully changed in accordance with the manual operation in the readily sensible area such as the low air amount area and the blowing temperature of approximate 25° C. Further, a storage capacity of the stand-by RAM contained in the microcomputer 21 can be reduced as compared with the storage medium where each air blowing amount manually operated by the passenger is stored, thereby requiring no expensive storage medium, and reducing production cost of the vehicle air conditioner.

(Second Embodiment)

Figure 9:
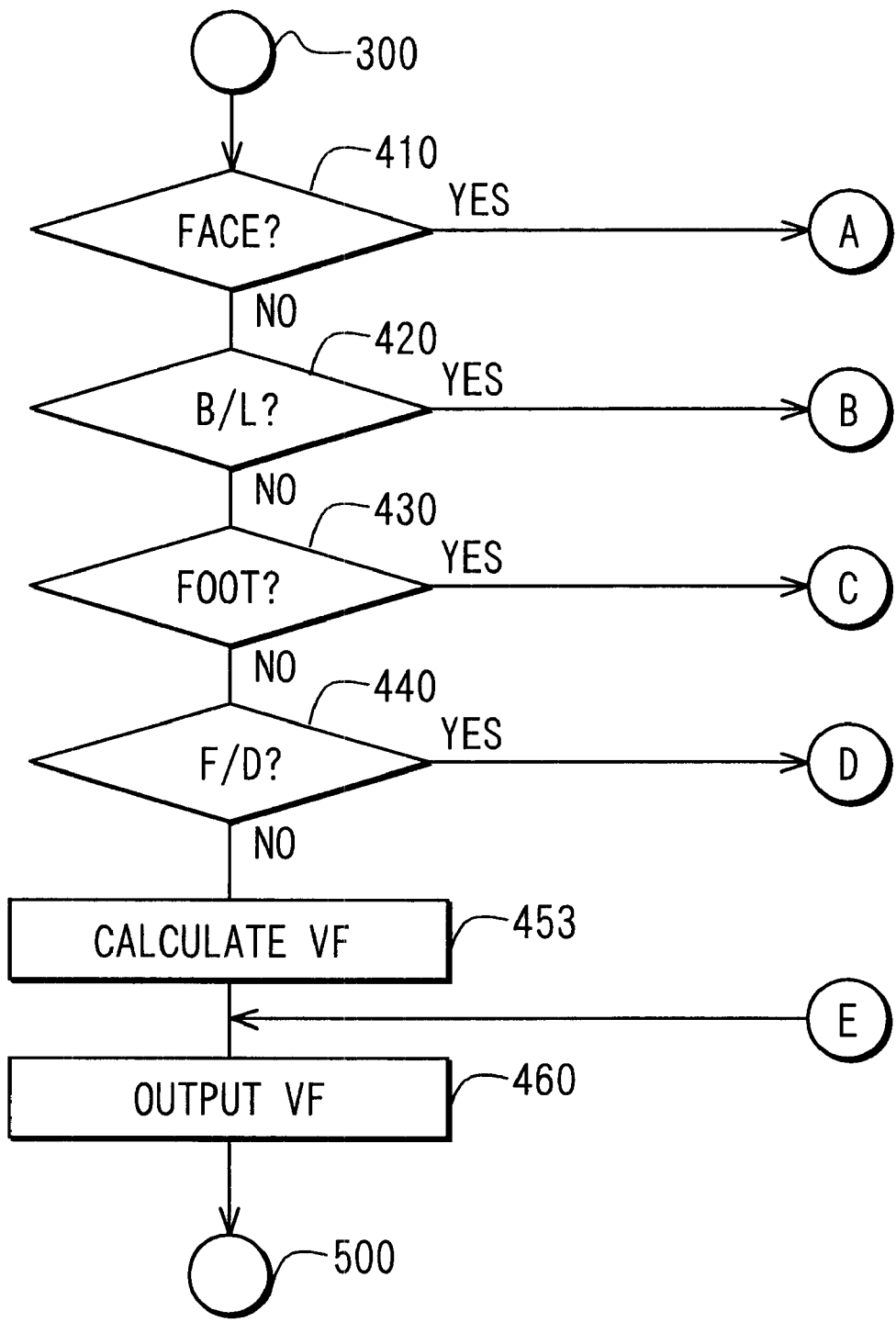
FIG. 9 is a flow diagram showing a blower voltage control according to a second embodiment of the present invention.
Figure 10A:
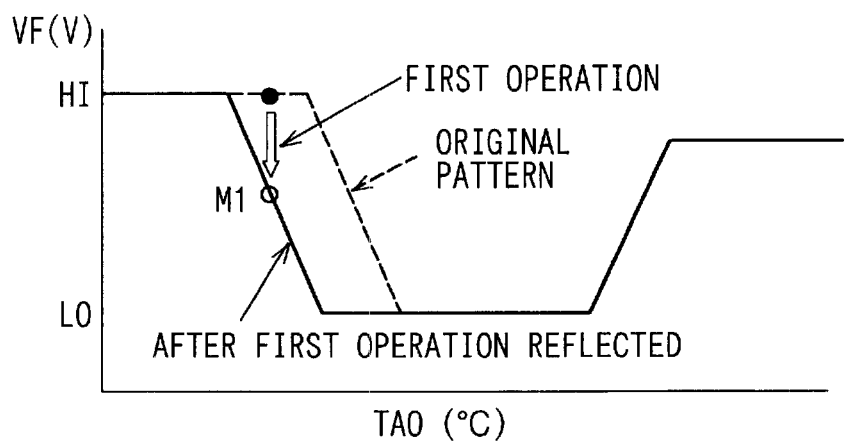
FIG. 10A is a characteristic graph showing a blower-voltage control pattern after reflecting a first manual operation in an original blower-voltage control pattern.

The second embodiment of the present invention will be described with reference to FIGS. 9 and 10A–10C. When the air blowing amount is fixed at a high level in a case where the defroster mode is required, the possibility for manually operating the air blowing amount is smaller. Therefore, in the second embodiment as shown in FIG. 9, steps S451, S452 shown in FIG. 4 are eliminated. In FIG. 9, the control operation at the other steps are similar to those in FIG. 4. The blower voltage control characteristic is adjusted to the original pattern shown in FIGS. 10A–10C when the vehicle air conditioner is shipped. When the passenger reduces the air blowing amount as a first manual operation as shown in FIG. 10A, the slant portion of the original pattern is displaced to a straight line passing through an operation point M1 in parallel to the slant portion of the original pattern. After the first manual operation is reflected in the blower voltage control characteristic, the blower voltage control characteristic is changed to the solid line in FIG. 10A, and the air amount is automatically controlled based on the solid line in FIG. 10A.

Figure 10B:
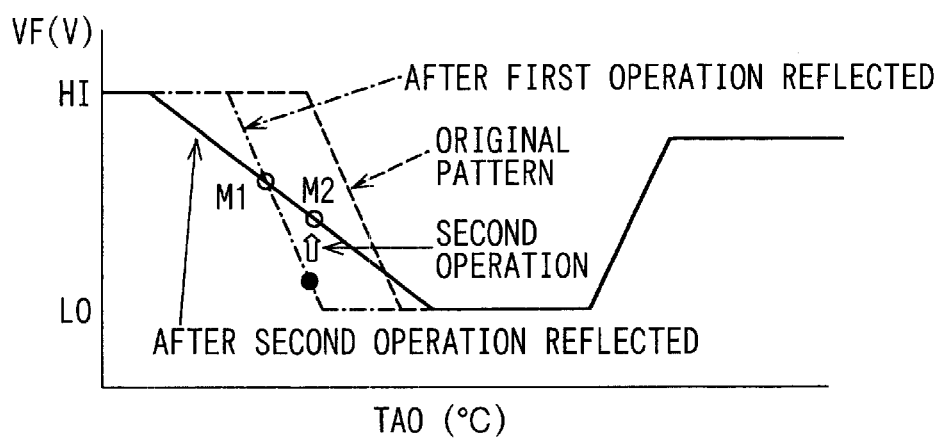
FIG. 10B is a characteristic graph showing a blower-voltage control pattern after reflecting a second manual operation in the blower-voltage control pattern shown in FIG. 10A.
Figure 10C:
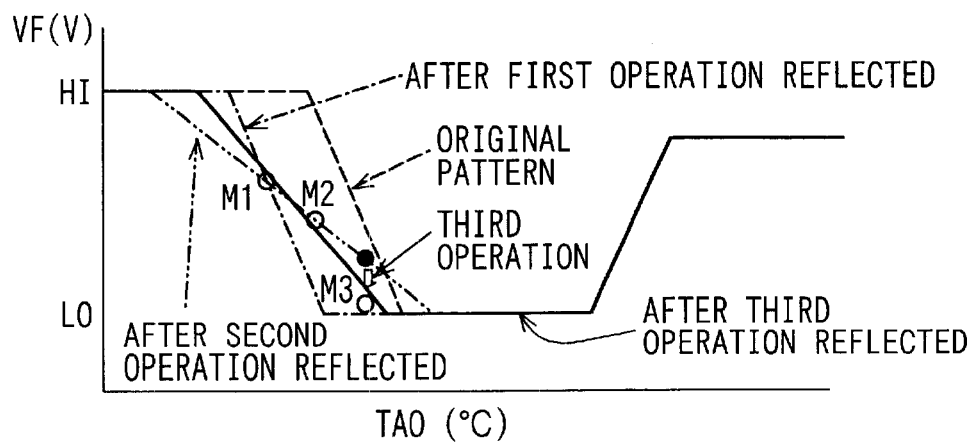
FIG. 10C is a characteristic graph showing a blower-voltage control pattern after reflecting a third manual operation in the blower-voltage control pattern shown in FIG. 10B, according to the second embodiment.

Then, when the passenger reduces the air blowing amount as a second manual operation as shown in FIG. 10B, the changed pattern due to the first manual operation is inclined to pass through an operation point M2 and the operation point M1. After the second manual operation is reflected in the blower voltage control characteristic, the blower voltage control characteristic is changed to the solid line in FIG. 10B. When the passenger reduces the air blowing amount as a third manual operation as shown in FIG. 10C, the changed pattern due to the second manual operation is inclined to the solid straight line shown in FIG. 1C. The solid straight line in FIG. 10C is approximated in the least square by the operation points M1, M2, M3. Further, when the passenger performs three or more times of manual operation, the blower voltage control characteristic is changed to a line approximated in the least square by three or more operation points.

According to the second embodiment of the present invention, the original pattern shown in FIGS. 10A–10C is stored when the vehicle air conditioner is shipped. When the control pattern of the blower voltage control map is changed so that the manually operation points are reflected, the previous change is not rejected but is learned. That is, the first change shown in FIG. 10A is similar to that of the above-described first embodiment. However, in the second embodiment, when the second change is caused, the previous first change is not rejected, but the second change is performed to pass through both of the first and second operation points, as shown in FIG. 10B. When the third change is performed, the control pattern of the blower voltage control map is changed to a straight line approximating the first operation point, the second operation point and the third operation point while the straight line does not pass through all the operation points, as shown in FIG. 10C.

(Third Embodiment)

Figure 11:
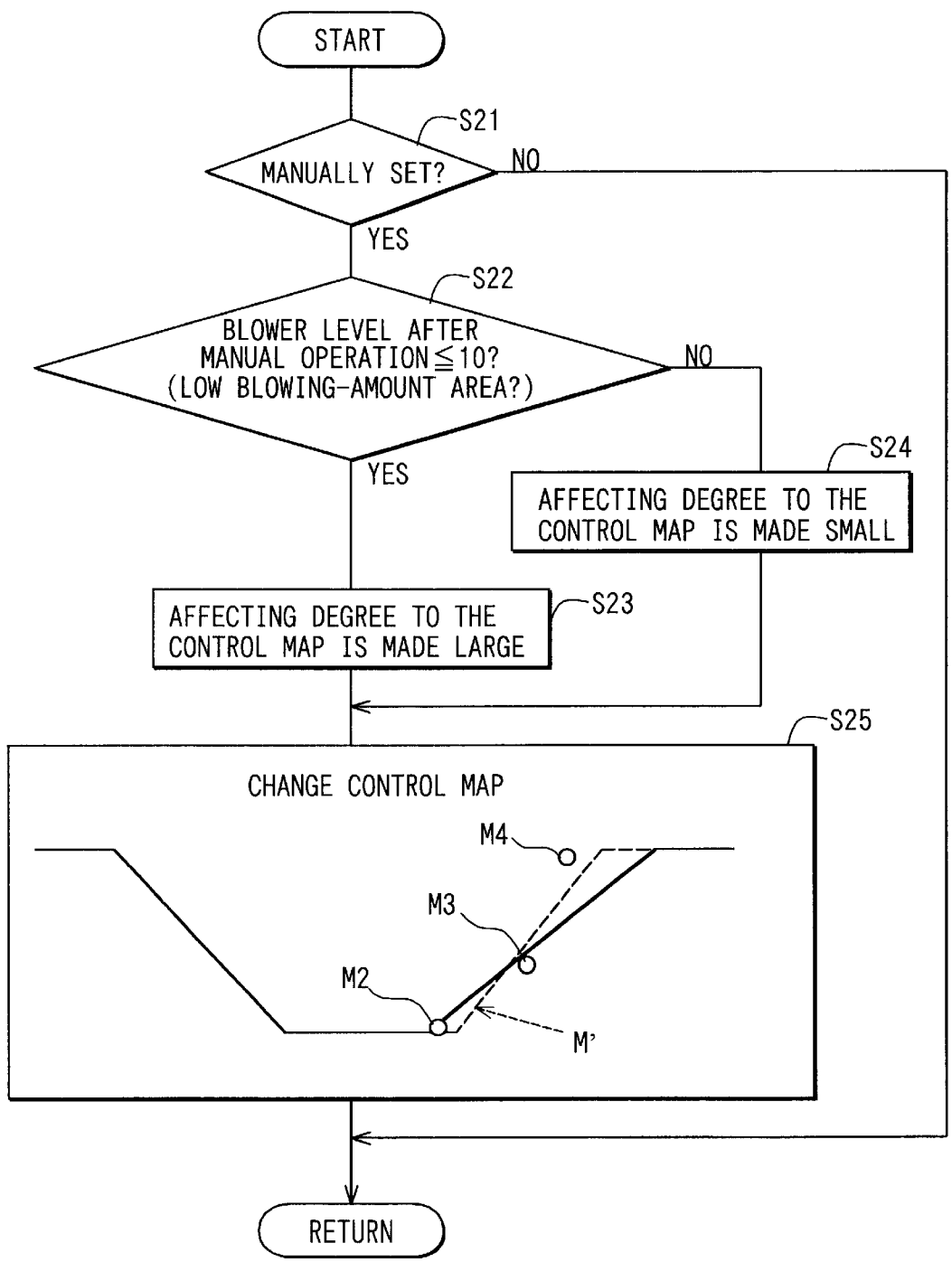
FIG. 11 is a flow diagram showing a learning-change control for an air amount control map, according to a third embodiment of the present invention.

The third embodiment of the present invention will be described with reference to FIG. 11. In the third embodiment, at step S21 shown in FIG. 11, it is determined whether or not the passenger manually sets the air blowing amount in the air amount automatic mode as in the first embodiment. When the determination at step S21 is YES, that is, when it is determined that the passenger manually sets the air blowing amount, it is determined whether or not an air blowing level after the manual operation is in the readily sensible area at step S22. That is, at step S22, it is determined whether or not the air blowing level is equal to or lower than a predetermined level (e.g., 10 levels).

When the determination at step 22 is YES, that is, when the air blowing level after the manual operation is in the readily sensible area, it is determined that the above manual-set air amount is largely affected to the blower voltage control map at step S23. That is, the affecting degree of the manually set air amount to the blower voltage control map is larger. When the determination at step S22 is NO, that is, when the air blowing level after the manual operation is in the unreadily sensible area, it is determined that the affecting degree of the manual-set air amount to the blower voltage control map is small at step S24. Then, at step S25, the blower voltage control map is formed so that the air amount control pattern is changed to the solid line approximated in the least square by the operation points M2, M3, M4 where the air amount change is readily sensible for the passenger. In the graph at step S25 in FIG. 11, M' shows a comparison example where the affecting degree is made low and uniform in the low air amount area.

According to the third embodiment, the manually set blowing operation can be set at plural levels. Further, as the manually set operation point is in a low level side, the affecting degree of the manually set operation point is made larger. That is, the control pattern is set at a straight line that is approximated to the manual operation point such that, as the manually set air-blowing amount level becomes lower, the reflecting ratio reflected in the following automatic air amount control can be made larger.

Accordingly, in the third embodiment, a passenger' preference can be effectively reflected in the blower voltage control characteristic even when a simple air amount control map is used. Thus, the passenger's preference can be faithfully reflected in the blower voltage control characteristic in the readily sensible area and even by the low-priced microcomputer 21 including the stand-by RAM having a small storage capacity.

(Fourth Embodiment)

Figure 12:
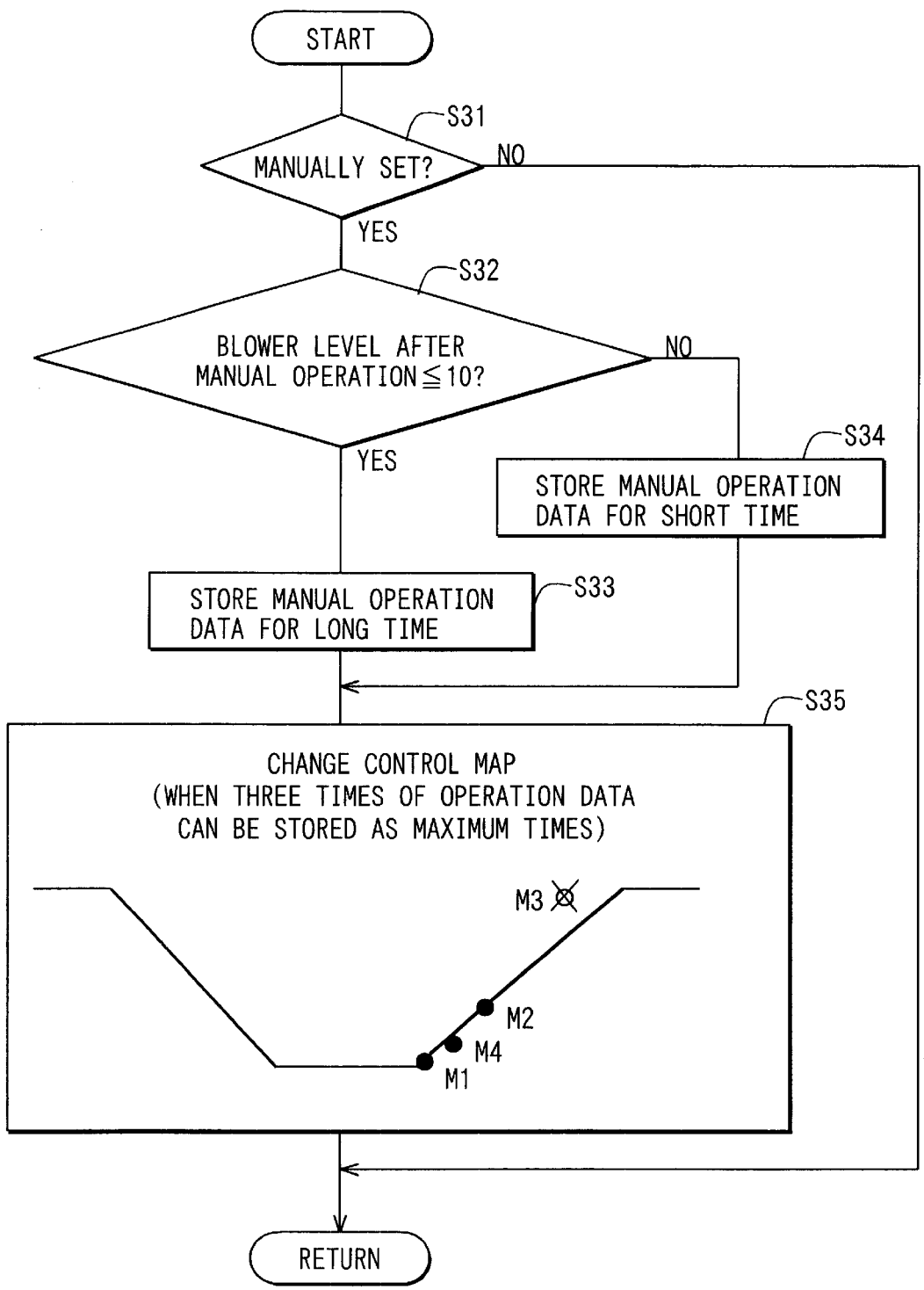
FIG. 12 is a flow diagram showing a learning-change control for an air amount control map, according to a fourth embodiment of the present invention.

The fourth embodiment of the present invention will be now described with reference to FIG. 12. In the fourth embodiment, at step S31 shown in FIG. 12, it is determined whether or not the passenger manually sets the air blowing amount in the air amount automatic mode as in the first embodiment. When the determination at step S31 is YES, that is, when it is determined that the passenger manually sets the air blowing amount, it is determined whether or not an air blowing level after the manual operation is in the readily sensible area at step S32. That is, at step S32, it is determined whether or not the air blowing level is equal to or lower than a predetermined level (e.g., 10 levels).

When the determination at step S32 is YES, that is, when the air blowing level after the manual operation is in the readily sensible area, it is determined that the above manually set air amount is stored in the storage medium for a long time at step S33. When the determination at step S32 is NO, that is, when the air blowing level after the manual operation is in the unreadily sensible area, it is determined that the above manually set air amount is stored in the storage medium for a short time at step S34. For example, in a case where three, operation points can be stored, when a fourth operation point is in the low air amount area and a third operation point is in the high air amount area, the third operation point is eliminated. Therefore, at step S35, the blower voltage control map is formed so that the air amount control pattern is changed to the solid line approximated in the least square by the operation points M1, M2, M4. Accordingly, the passenger's preference can be reflected in the blower voltage control characteristic even when the low-priced microcomputer 21 including the stand-by RAM having a small storage capacity is used.

In the fourth embodiment, when the control pattern of the blower voltage control operation is changed, the previous change is not rejected but is further learned. However, all the old manual operation data is not considered, and a part of the old manual operation data is rejected. The rejection time of the old manual operation data is determined based on the stored time determined at steps S33, S34. That is, the rejection time of the old manual operation data is determined based on the air blowing level after the manual operation. Accordingly, in the case where the three operation points can be stored, the first change of the control pattern of the blower voltage control map can be performed so that the control straight line of the blower voltage control map passes through the first operation point. Further, the second change of the control pattern of the blower voltage control map can be performed so that the control straight line of the blower voltage control map passes through the first and second operation points. Further, the third change of the control pattern of the blower voltage control map can be performed so that the control straight line of the blower voltage control map is changed while considering the first, second and third operation points. As described above, when the air blowing amount is manually operated at the fourth time, the fourth change of the control pattern of the blower voltage control map is performed so that the control straight line of the blower voltage control map is changed while considering the first, second and fourth operation points without using the third operation point. That is, the control straight line of the blower voltage control map is changed to the solid line in the graph at step S35 in FIG. 12, approximated in the first operation point M1, the second operation point M2 and the fourth operation point M4.

(Fifth Embodiment)

Figure 13:
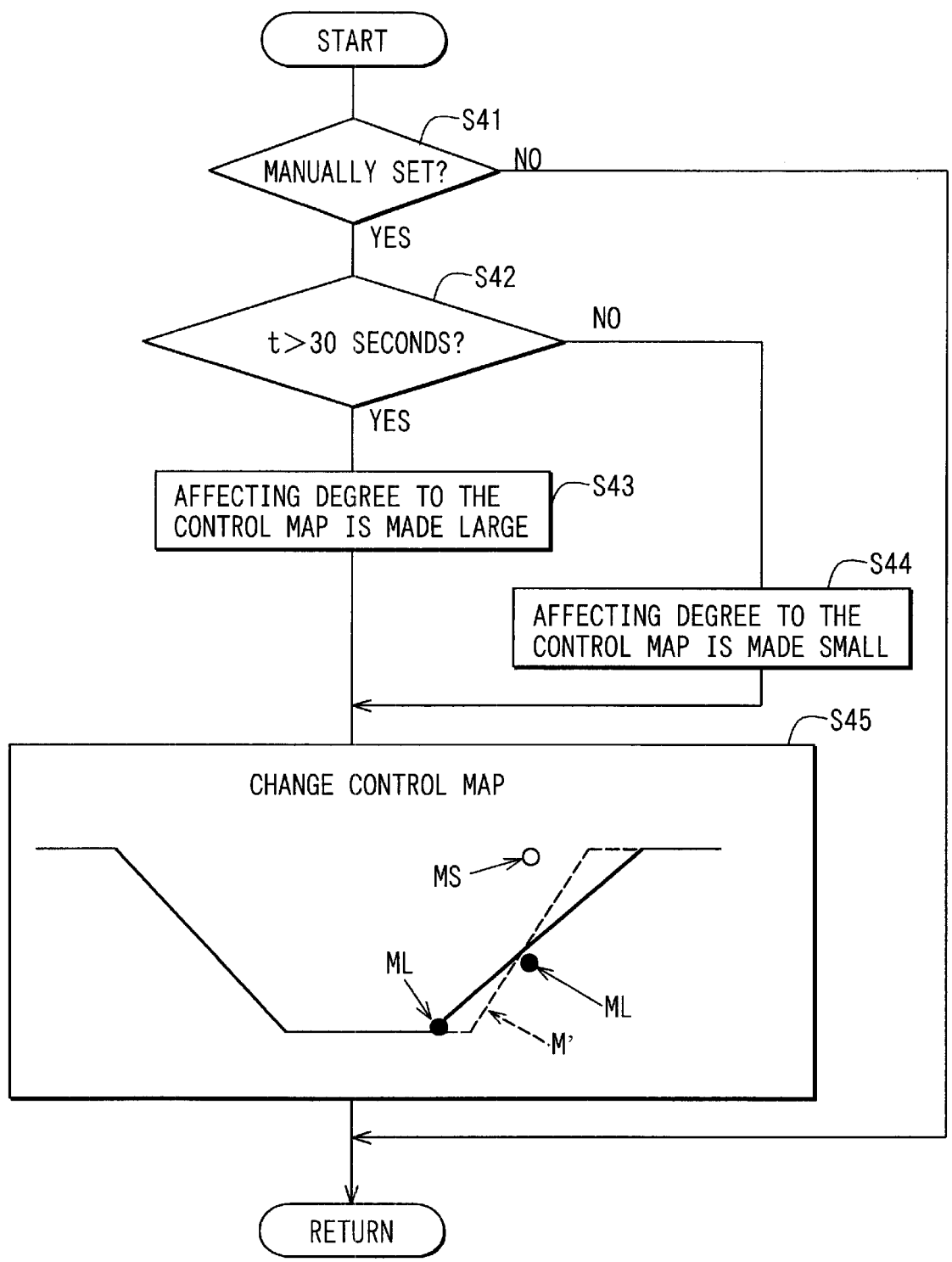
FIG. 13 is a flow diagram showing a learning-change control for an air amount control map, according to a fifth embodiment of the present invention.

The fifth embodiment of the present invention will be now described with reference to FIG. 13. In the fifth embodiment, at step S41 shown in FIG. 13, it is determined whether or not the passenger manually sets the air blowing amount in the air amount automatic mode as in the first embodiment. When the determination at step S41 is YES, that is, when it is determined that the passenger manually sets the air blowing amount, it is determined whether or not a time, for which an environmental condition is not changed, is long at step S42. At step S42, it is determined whether or not the manual operation is performed in a stable state, that is, it is determined whether or not a predetermined time (e.g., 30 seconds) passes after the air blowing amount is changed last when the manual operation is performed. Here, a range, where the air blowing level is determined to be stable, can be set. For example, when the air blowing level is changed in a range of ±1 level (e.g., corresponding to 0.025V of the blower voltage) of the blower level, the air blowing level is determined to be stable.

When the passed time "t" after the blower voltage is changed at the last time is longer than a predetermined time (e.g., 30 seconds) at step S42, it can be determined that the blower level is in the stable level, and it can be determined that a passenger's discontenting degree with the air blowing amount before the manual operation is high. Therefore, the manually-set air blowing amount is largely reflected in the air amount control map at step S43. When the determination is NO at step S42, it can be determined to be difficult to estimate an degree of the passenger discontent with the air blowing amount before the manual operation. Therefore, the air blowing amount manually set is slightly reflected in the air amount control map at step S44. That is, at step S43, the affecting degree of the manual operation is made larger. On the other hand, at step S44, the affecting degree of the manual operation is made smaller. Then, at step S45, the control pattern of the blower voltage control map is changed to a solid line more approximated in the operation points ML where the affecting degree of the manual operation is larger, as compared with the operation point MS where the affecting degree of the manual operation is smaller.

(Sixth Embodiment)

Figure 14:
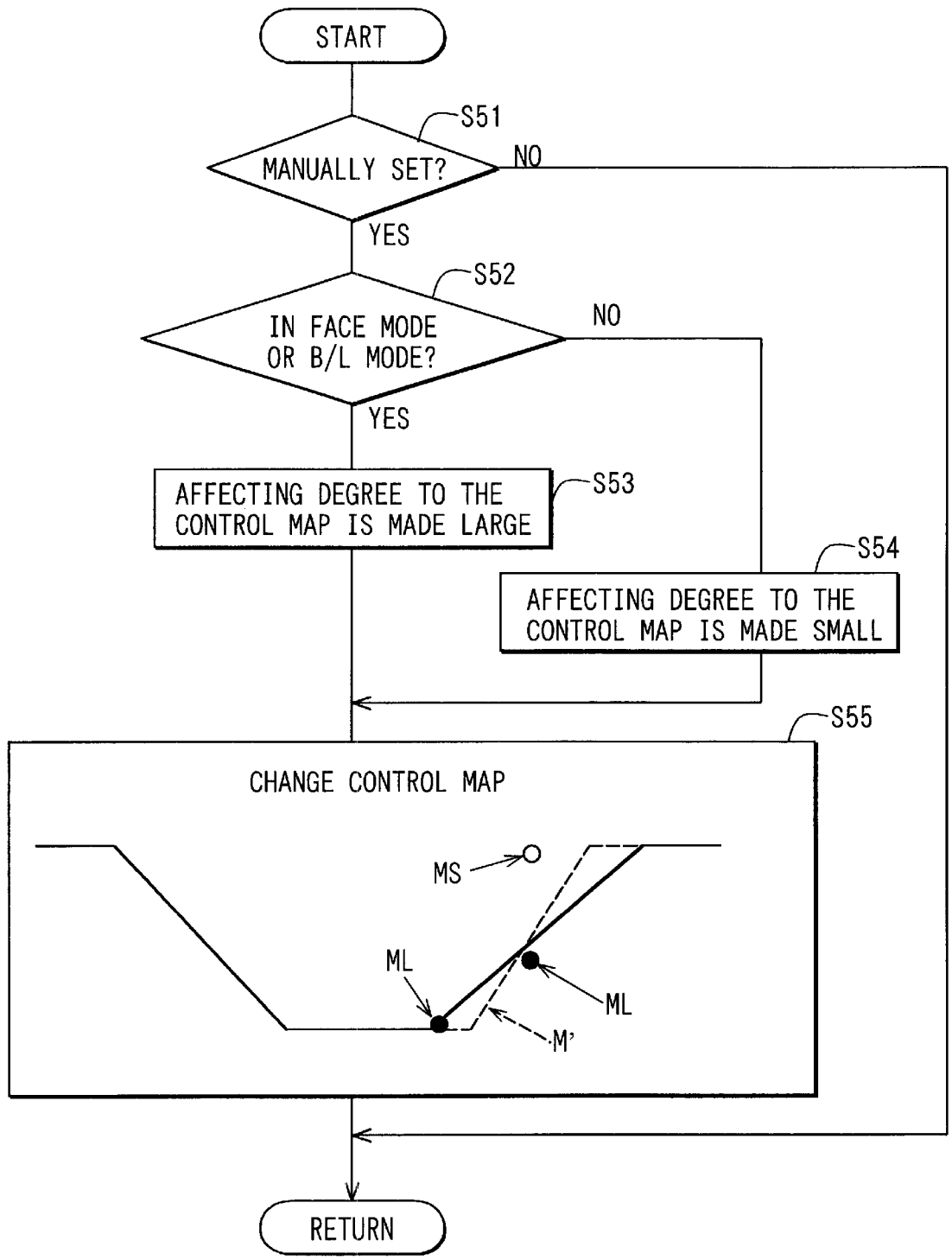
FIG. 14 is a flow diagram showing a learning-change control for an air amount control map, according to a sixth embodiment of the present invention.

The sixth embodiment of the present invention will be described with reference to FIG. 14. In the sixth embodiment, at step S51 shown in FIG. 14, it is determined whether or not the passenger manually sets the air blowing amount in the air amount automatic mode as in the first embodiment. When the determination at step S51 is YES, that is, when it is determined that the passenger manually sets the air blowing amount, it is determined whether or not the air outlet mode is a mode such as the face mode and the B/L mode, where conditioned air is blown to the upper body portion (especially, the face) of the passenger, at step S52. When the determination is YES at step S52, that is, when the air blowing amount is manually operated in the air outlet mode where much amount of conditioned air is blown to the upper half body of the passenger, it is determined that the passenger's preference is more reflected, than in an air outlet mode such as the foot mode and the F/D mode, where the air amount change is difficult to be sensible for the passenger. Therefore, the affecting degree of the manually set air blowing amount is made larger at step S53 so that the operation points ML are largely reflected in the blower voltage control map at step S55.

When the determination is NO at step S52, that is, when the air blowing amount is manually operated in the air outlet mode such as the foot mode and the F/D mode where conditioned air blown to the upper body portion of the passenger is small, the affecting degree of the manually-set air blowing amount is made small at step S54 so that the operation point MS is slightly reflected in the blower voltage control map at step S55. Accordingly, manual operation data, set in the air outlet mode where the air amount change is readily sensible for the passenger, is more largely reflected in the air amount control map. Thus, the air amount control characteristic rapidly approaches a characteristic fitted to the passenger's preference.

According to the sixth embodiment, the affecting degree of the manual operation is determined based on the air outlet mode for determining the blowing direction of air within the passenger compartment.

(Seventh Embodiment)

Figure 15:
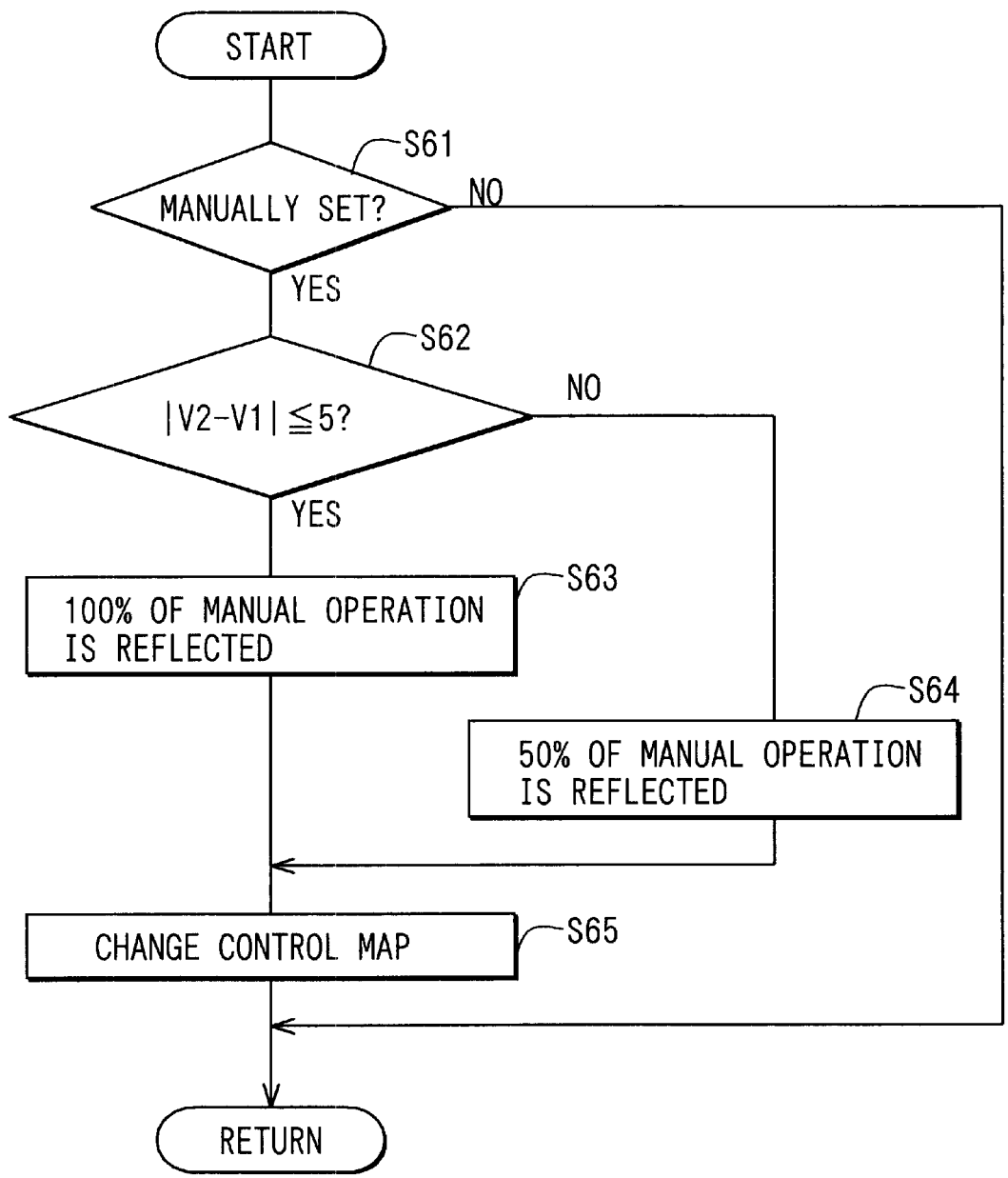
FIG. 15 is a flow diagram showing a learning-change control for an air amount control map, according to a seventh embodiment of the present invention.

The seventh embodiment of the present invention will be now described with reference to FIG. 15. In the seventh embodiment, irregular manual operation is made difficult to be reflected in the blower voltage control map. As shown in FIG. 15, at step S61, it is determined whether or not the passenger manually sets the air blowing amount in the air-amount automatic control mode. When the determination at step S61 is YES, it is determined whether or not the air blowing amount is manually set at a passenger's preference control value at step S62. In the manual operation, the passenger increases the blower voltage by one level (0.25V) or more by pushing the air amount up switch, or reduces the blower voltage by one level (0.25V) or more by pushing the air amount down switch. Specifically, it is determined whether or not the manual operation level is away from a reference control value (e.g., five levels) at step S62. That is, it is determined whether or not a difference ($|V2-V1|$) between the blower voltage level V2 after the manual operation and the basic blower voltage level V1 before the manual operation is equal to or smaller than a predetermined voltage (e.g., 5). When the determination at step S62 is YES, that is, when it is determined that the air blowing amount after the manual operation is not greatly different from the basic air amount before the manual operation, it is determined at step S63 that 100% of the manual operation amount is reflected in the blower voltage control map after the manual operation is performed.

When the determination at step S62 is NO ($|V2-V1|>5$), that is, when it is determined that the air blowing amount after the manual operation is greatly different from the basic air amount before the manual operation, it can be determined that a possibility of irregular manual operation is high. Therefore, at step S64, 50% of the manual operation amount is reflected in the blower voltage control map after the manual operation is performed. Then, at step S65, the manual operation amount is reflected in the blower voltage control map based on the reflecting degree at step S63, S64, and the blower voltage control map is changed.

For example, when the passenger get on the vehicle and starts automatic air-conditioning operation in the passenger compartment after sporting hard, the passenger prefers an air blowing temperature lower than in an usual case and an air blowing amount larger than in the usual case. In this case, since the passenger is not satisfied with an air blowing amount corresponding to the blower voltage control characteristic in which the previous manual operation has been reflected, the passenger manually changes the air blowing amount to an air blowing amount satisfying the passenger. However, if the manual operation, performed in such condition, is reflected in the blower voltage control characteristic, the blower voltage control characteristic is changed to be different from a general passenger's preference. Accordingly, when the air blowing amount after the manual operation is largely different from the basic air amount, only a part (e.g., 50%) of the manual operation amount is reflected in the blower voltage control characteristic.

When the air blowing amount after manual operation is different from the basic control amount beforehand stored in the storage medium (memory) by more than the reference control amount, the manual operation can be determined to be irregular in a high possibility. Therefore, the air blowing amount set by such manual operation can be made not to be completely reflected in the blower voltage control characteristic. Thus, the control pattern of the blower voltage control characteristic, in which manual operation is reflected to realize comfortable air-conditioning operation, cannot be largely disturbed. Further, as the manual operation approaches the original automatic control pattern of the air blowing amount, the reflecting percentage of the manual operation is made larger. Accordingly, the manual operation can be rapidly reflected in the air amount automatic control to be more rapidly fitted to the passenger's preference.

In the seventh embodiment, when the air blowing amount after manual operation is different from the basic control amount beforehand stored in the storage medium (memory) by more than the reference control amount, it is determined that the manual operation is an irregular operation in a high possibility, and 50% of the manual operation amount is reflected in the blower voltage control map. However, in the seventh embodiment, as the air blowing amount after the manual operation is more different from the reference control amount, the reflecting degree of manual operation can be made smaller. In this case, the control straight line does not pass through the operation point, but is approximated to the manual operation point by a simple straight line in accordance with the reflecting degree. As the reflecting degree is smaller, a degree for approximating to the manual operation point is made litter.

On the other hand, when the air blowing amount after manual operation is slightly different from the basic control amount beforehand stored in the storage medium (memory) by less than the reference control amount, it is determined that the manual operation is a regular operation, and 100% of the manual operation amount is reflected in the blower voltage control map. In this case, the control straight line is changed to pass through the manual operation point, so that the passenger's manual operation can be readily reflected in the air amount automatic control. Thus, a storage capacity can be made smaller in the seventh embodiment.

(Eighth Embodiment)

Figure 16:
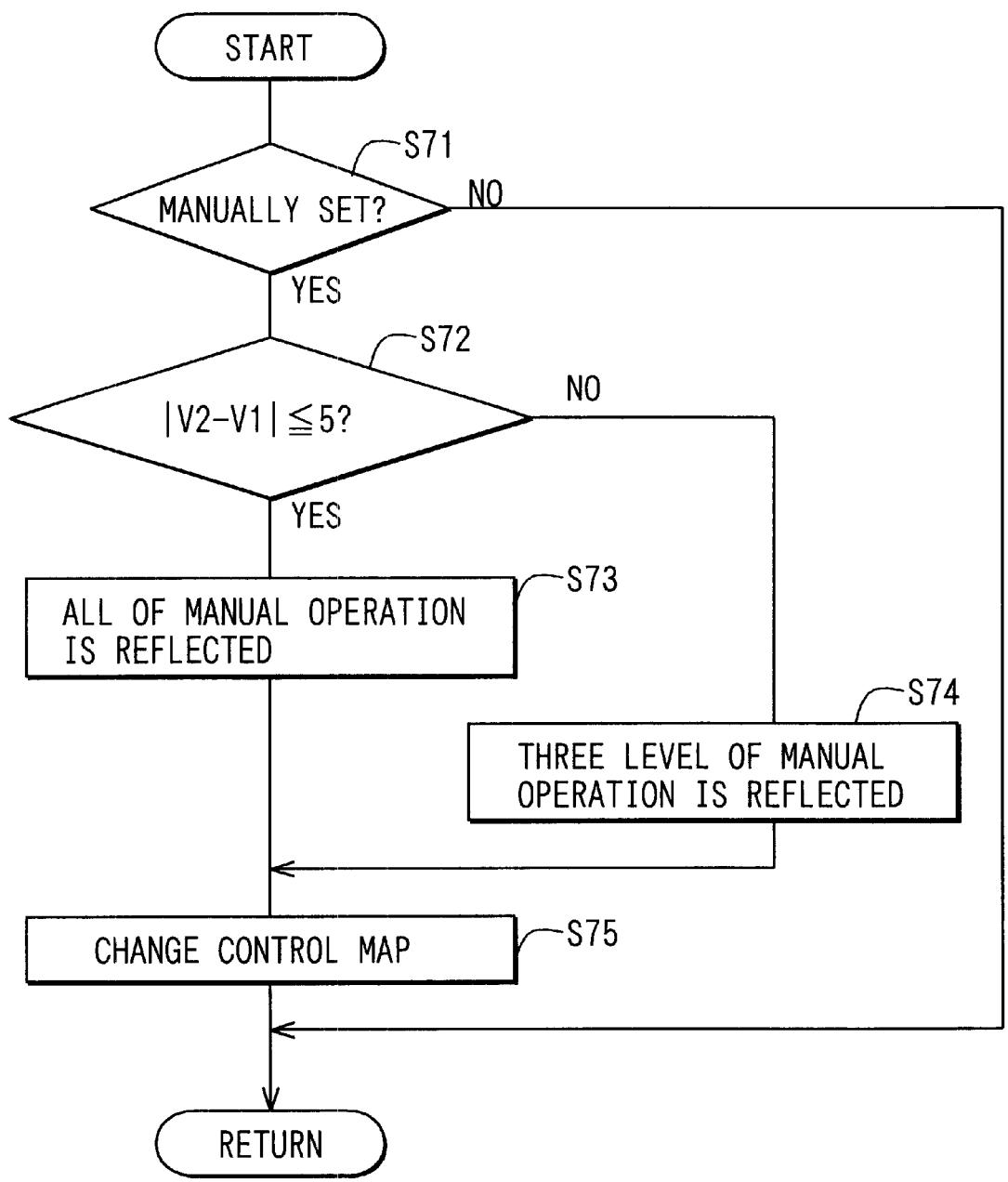
FIG. 16 is a flow diagram showing a learning-change control for an air amount control map, according to an eighth embodiment of the present invention.

In the eighth embodiment, as shown in FIG. 16, at step S71, it is determined whether or not the passenger manually sets the air blowing amount in the air amount automatic control as in the seventh embodiment. When the determination at step S71 is YES, it is determined whether or not the air blowing amount V2 after the manual operation is not different from the basic air amount V1 before the manual operation by much more than the reference control amount (e.g., five levels) at step S72. When the determination at step S72 is YES, that is, when it is determined that the air blowing amount after the manual operation is not so much different from the basic air amount before the manual operation, it is determined at step S73 that all of the manual operation amount is reflected in the air amount control after the manual operation is performed. When the determination at step S72 is NO, that is, when it is determined that the air blowing amount after the manual operation is greatly different from the basic blowing amount before the manual operation by much more than the reference control amount, it can be determined that irregular manual operation is performed in a high possibility. Therefore, at step S74, it is determined that a predetermined amount (e.g., three levels) of the manual operation amount is reflected in the air amount control after the manual operation is performed.

Then, at step S75, the predetermined amount of the manual operation amount determined at steps S73, S74 is reflected in the air amount control map after the manual operation is performed. When the air blowing amount after manual operation is greatly different from the original automatic control pattern, that is, the basic control amount beforehand stored in the storage medium by more than the reference control amount, it is determined that the manual operation is irregular in a high possibility. Therefore, in this case, 100% of the irregular manual operation amount can be prevented from being reflected in the blower voltage control characteristic by setting the percentage reflected in the blower voltage control characteristic at 0% or reducing the percentage reflected therein. Thus, the air amount control characteristic rapidly approaches an air-amount characteristic fitted to the passenger's preference. Further, as the manual operation approaches the original automatic control pattern of the air blowing amount, the reflecting percentage of the manual operation is made longer. Accordingly, the manual operation can be rapidly reflected in the next air amount automatic control.

(Ninth Embodiment)

Figure 17:
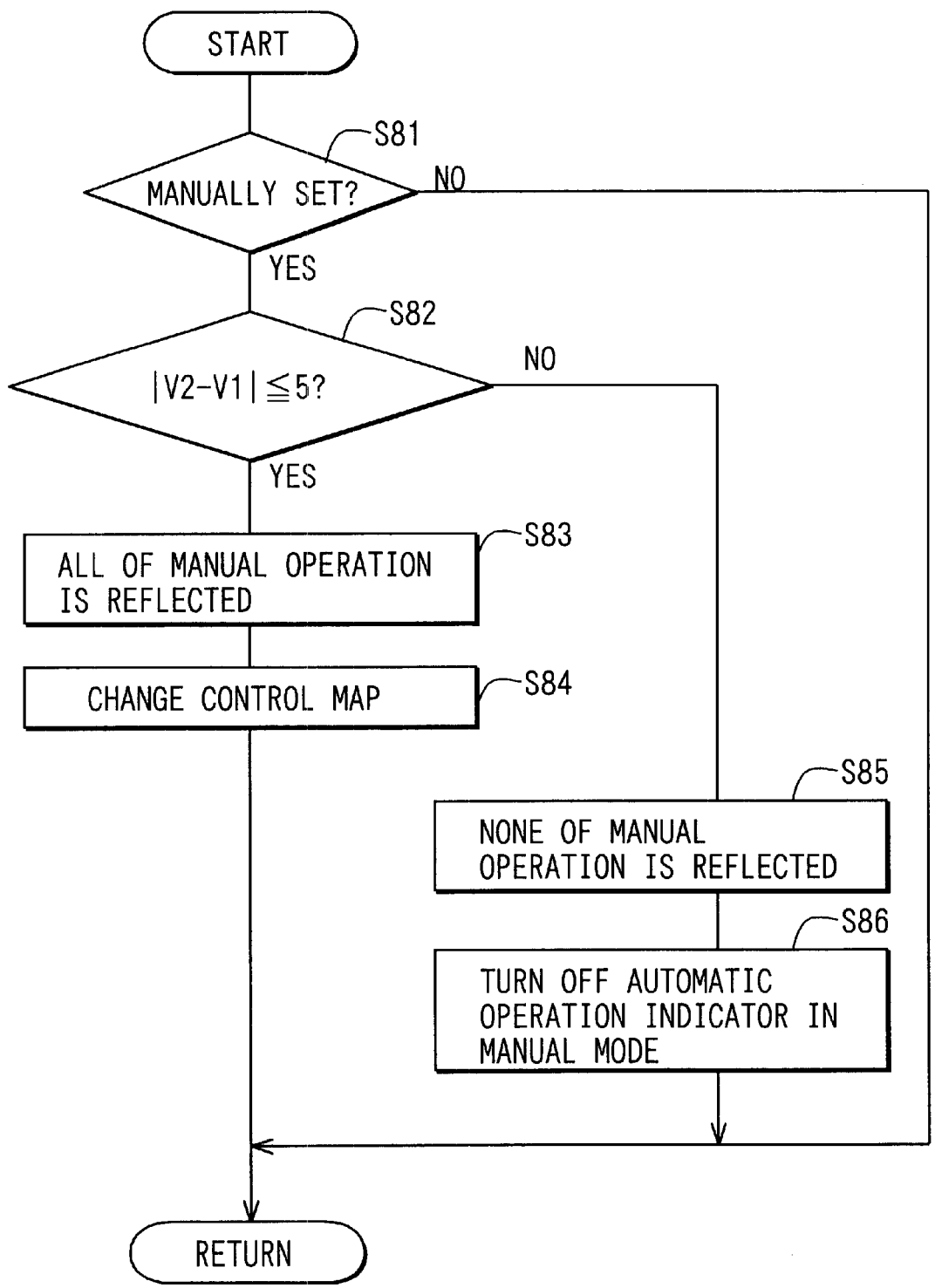
FIG. 17 is a flow diagram showing a learning-change control for an air amount control map, according to a ninth embodiment of the present invention.

The ninth embodiment of the present invention will be described with reference to FIG. 17. In the ninth embodiment, as shown in FIG. 17, at step S81, it is determined whether or not the passenger manually sets the air blowing amount in the air amount automatic control as in the seventh embodiment. When the determination at step S81 is YES, it is determined whether or not the air blowing amount is manually set at an air blowing amount of the passenger's preference at step S82. Specifically, it is determined whether or not the air blowing amount V2 after the manual operation is not separated from the basic air amount V1 before the manual operation by much more than the reference control amount (e.g., five levels) at step S82. When the determination at step S82 is YES, that is, when it is determined that the air blowing amount after the manual operation is not so much different from the basic air amount before the manual operation, it is determined at step S83 that all of the manual operation amount is reflected in the air amount control characteristic after the manual operation is performed. Then, at step S84, all of the manual operation amount is reflected in the air amount control after the manual operation is performed.

When the determination at step S82 is NO, that is, when it is determined that the air blowing amount V2 after the manual operation is greatly different from the basic air amount V1 before the manual operation by much more than the reference control amount, the manual operation amount is not reflected in the air amount control after the manual operation is performed at step S85. Then, at step S86, the automatic operation indicator 34 shown in FIG. 2 is turned off while the air amount control mode is fixed to the manual mode. At this time, the learning mode indicator 32 can be turned off to indicate a mode where the present manual operation is not reflected in the blower voltage control characteristic.

Because the irregular manual operation is not reflected in the blower voltage control characteristic, the regular air-amount control pattern is not disturbed. For example, when the irregular manual operation is performed, the irregular manual operation is not reflected in the next automatic control.

In the ninth embodiment, when the affecting degree of the manual operation to the automatic control is small, the manual operation is not reflected in the next automatic control.

(Tenth Embodiment)

The tenth embodiment of the present invention will be described with reference to FIG. 18.

Figure 18:
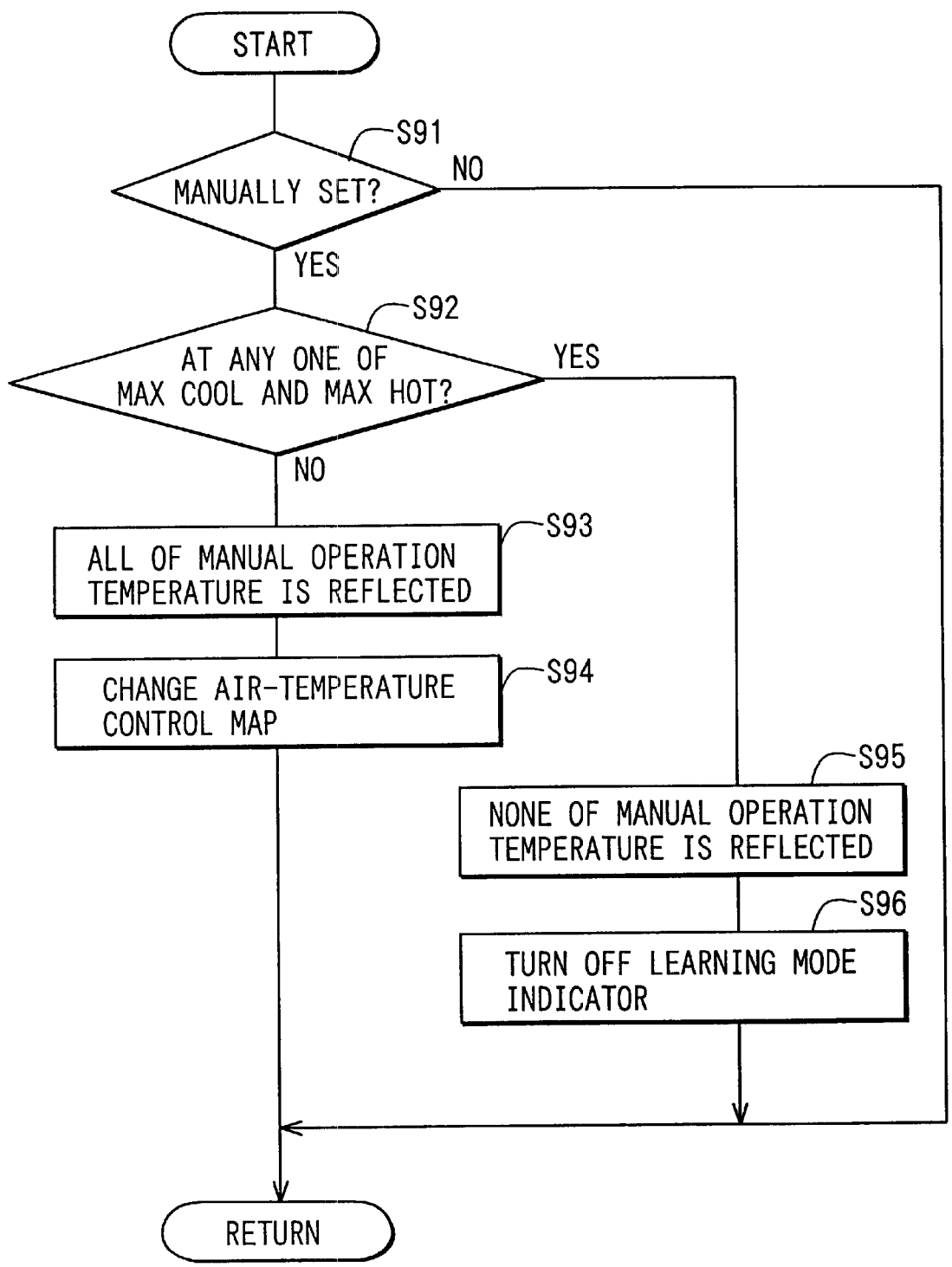
FIG. 18 is a flow diagram showing a learning-change control for an air temperature control map, according to a tenth embodiment of the present invention.

As shown in FIG. 18, at step S91, it is determined whether or not the passenger manually sets the air temperature in the air-temperature automatic control mode. When the determination at step S91 is YES, it is determined whether or not the air temperature is manually set at any one of MAXCOOL (e.g., equal to or lower than 20° C.) and MAXHOT (e.g., equal to or higher than 30° C.) at step S92. In the manual operation, the passenger increases the air temperature by one level (0.5° C.) or more by pushing the air temperature up switch of the temperature setting switch 27, or reduces the air blowing temperature by one level (0.5° C.) or more by pushing the air temperature down switch of the temperature setting switch 27. When the determination at step S92 is NO, that is, when it is determined that the air blowing temperature is manually set at a temperature different from the MAXCOOL and MAXHOT, it is determined at step S93 that all the temperature change manually performed by the temperature setting switch 27 is reflected in the air temperature control after the manual operation is performed. Then, at step S94, all the changed temperature is reflected in the air temperature control characteristic after the manual operation is performed. Specifically, the target open degree SW of the A/M door 11 is reduced or increased in accordance with the target blowing temperature TAO.

When the determination at step S92 YES, that is, when it is determined that the air temperature is manually set at any one of the MAXCOOL and the MAXHOT, it can be determined in a high possibility that irregular manual operation is performed. Therefore, at step S95, the temperature change manually performed by the temperature setting switch 27 is not reflected in the next automatic air temperature control after the manual operation is performed. That is, the affecting degree of the manual operation to the air temperature control is made smaller, and the manual operation is not reflected in the next air temperature control map. Then, at step S96, the learning mode indicator 32 is turned off to indicate that none of the changed temperature is reflected in the next automatic air temperature control. Because the irregular manual operation is not reflected in the next automatic temperature control, the regular manual operation is readily reflected in the next automatic air temperature control to be readily fitted to the passenger's preference. Thus, the air temperature control characteristic rapidly approaches to the passenger's preference characteristic.

In the tenth embodiment, when the air amount is manually set at the maximum value or minimum value, the manual operation is not reflected in the control characteristic, similarly to the above-described temperature control shown in FIG. 18.

(Eleventh Embodiment)

Figure 19:
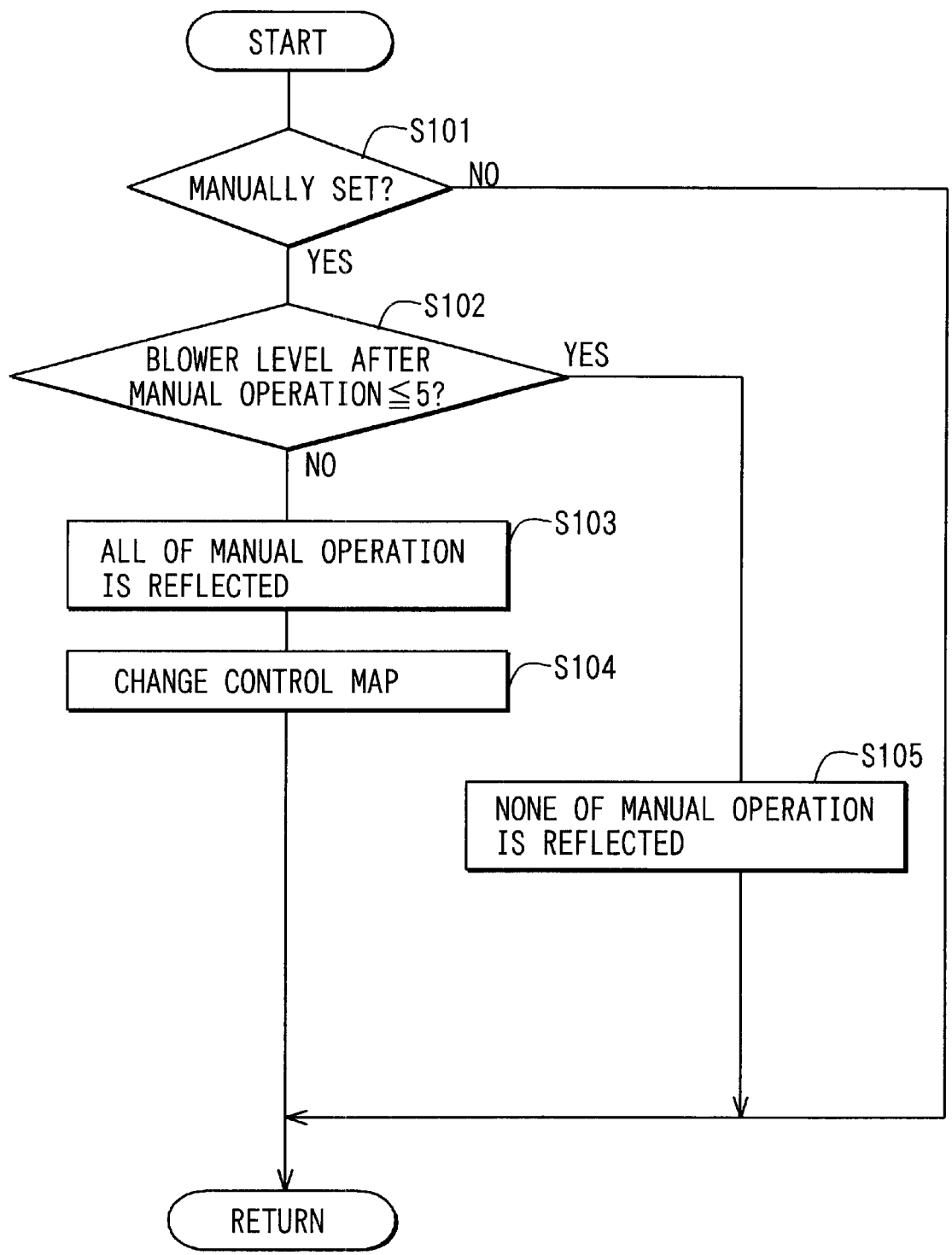
FIG. 19 is a flow diagram showing a learning-change control for an air amount control map, according to an eleventh embodiment of the present invention.

The eleventh embodiment of the present invention will be described with reference to FIG. 19. In the eleventh embodiment, as shown in FIG. 19, at step S101, it is determined whether or not the passenger manually sets the air blowing amount in the air amount automatic control mode as in the seventh embodiment. When the determination at step S101 is YES, it is determined whether or not the blower level after the manual operation is equal to or lower than a predetermined level (e.g., five levels) at step S102. When the determination at step S102 is NO, it is determined that the air blowing amount after the manual operation is sufficient. In this case, it is determined that the affecting degree of the manual operation to the air amount control is high, and all of the manual operation is reflected in the next automatic air amount control after the manual operation is performed. Then, at step S104, the blower voltage control map is changed so that all the manual operation is reflected. When the determination at step S102 is YES, that is, when it is determined that the air amount after the manual operation is excessively low, it can be determined in a high possibility that irregular manual operation is performed. In this case, an amount of conditioned air reaching a rear seat is reduced. Accordingly, in this case, the affecting degree of the manual operation to the air amount control characteristic is small. Therefore, at step S105, the manual operation amount is not reflected in the next air-amount automatic control after the manual operation is performed. At this time, the learning mode indicator 32 can be turned off to indicate a mode where the present manual operation is not reflected in the blower voltage control characteristic.

In the eleventh embodiment, when the air amount is manually set in a low blower voltage control where the air amount blown into the passenger compartment is small, the manual operation is set to be not reflected in the next automatic control. For example, at a minimum blower level, the manual operation is not reflected in the blower voltage control characteristic, or an amount of the manual operation to be reflected in the blower voltage control characteristic is reduced. Preferably, the minimum blower level is changed in accordance with thermal loads of the air conditioner.

(Other Embodiments)

In the above embodiments, the voltage applied to the blower motor 6, manually operated by the passenger is reflected in the blower voltage control characteristic, or the air blowing temperature manually set by the passenger using the temperature setting switch 27 is reflected in the air temperature control characteristic. However, other manual operation may be reflected in the air-conditioning control characteristic such as the inside/outside air control characteristic and the air outlet mode control characteristic.

The stand-by RAM is used to store values learned as passenger's preferences even when an ignition switch (IG) is turned off in the above embodiments. However, a nonvolatile memory such as an erasable programmable ROM (EPROM), an EEPROM and flash memory may be used in place of the stand-by RAM. Also in this case, even when energization for the nonvolatile memory is stopped by turning off IG, the learned values are stored in the nonvolatile memory.

The air blowing amount and the air blowing temperature are manually set by the air-conditioning control switch such as the air amount up switch and the air temperature up switch provided on the air-conditioning control panel in the above embodiments. However, the manual operation may be performed by a panel switch on an image plane of the air-conditioning operation panel, a touch switch on an image plane of a navigation system and a voice of the passenger. Further, 0% of the manual operation, reflected in the automatic air-conditioning control in the above embodiments, may be changed to a little %. In addition, 100% of the manual operation, reflected in the automatic air-conditioning control in the above embodiments, may be changed to a certain amount % such as 60% and 80%. Also in the cases, the same effects as in the above embodiments can be obtained.

While the present invention has been shown and described with reference to the foregoing preferred embodiments, it will be apparent to those skilled in the art that changes in form and detail may be made therein without departing from the scope of the invention as defined in the appended claims.

What is claimed is:

1. A vehicle air conditioner having automatic control, comprising:

an air-conditioning portion for adjusting an air-conditioning state in a passenger compartment of the vehicle;

a memory portion for memorizing an air-conditioning control characteristic of the air-conditioning portion;

an automatic control portion for automatically controlling the air-conditioning portion by a control amount corresponding to the air-conditioning control characteristic stored in the memory portion to perform the automatic control;

an operation portion manually operated by a passenger, for manually setting the air-conditioning state to a manual control value by operating the air-conditioning portion; and a change portion for learning and changing the air-conditioning control characteristic in accordance with the manual control value when the operation portion is manually operated in the automatic control, so that the manual control value is reflected in the next automatic control, wherein:

the change portion includes determining means for determining a necessary degree of a learning control of the air-conditioning control characteristic by determining whether the manual control value is within a predetermined range; and the change portion controls a reflecting degree of the manual control value in the air-conditioning control characteristic based on the necessary degree of the learning control.

2. The vehicle air conditioner according to claim 1, wherein:

when the manual control value is in a readily sensible area in which a change of the air-conditioning state due to the manual control value is readily sensible by the passenger, the change portion increases the reflecting degree of the manual control value reflected in the next automatic control, as compared with a case where the manual control value is in an unreadily sensible area in which a change of the air-conditioning state due to the manual control value is difficult to be sensible by the passenger.

3. The vehicle air conditioner according to claim 1, wherein:

the memory portion stores plural manual control values set by the operation portion through plural manual operations;

when a change of the air-conditioning state due to a manual control value among the plural manual control values is readily sensible by the passenger, the change portion increases the reflecting degree of the manual control value reflected in the next automatic control, as compared with a case where a change of the air-conditioning state due to a manual control value among the plural manual control values is difficult to be sensible by the passenger.

4. The vehicle air conditioner according to claim 1, wherein:

when the manual control value is in a readily sensible area in which a change of the air-conditioning state due to the manual control value is readily sensible by the passenger, the memory portion increases a storing time for which the manual control value is stored, as compared with a case where the manual control value is in an unreadily sensible area in which the change of the air-conditioning state due to the manual control value is difficult to be sensible by the passenger.

5. The vehicle air conditioner according to claim 1, wherein:

when a time for which an environmental condition for the air conditioning state is maintained is longer than a predetermined time period, the change portion increases the reflecting degree of the manual control value reflected in the next automatic control, as compared with a case where the time is shorter than the predetermined time period.

6. The vehicle air conditioner according to claim 1, further comprising:

an air outlet mode selecting portion for selecting at least one of a first mode where a flow amount ratio of air blown toward the upper body portion of the passenger is larger than a predetermined ratio, and a second mode where the flow amount ratio is smaller than the predetermined ratio, wherein:

in the first mode, the change portion increases the reflecting degree of the manual control value reflected in the next automatic control, as compared with that in the second mode.

7. The vehicle air conditioner according to claim 1, wherein:

when a difference between the manual control value and a basic control value that is stored in the memory portion is larger than a predetermined level, the change portion decreases the reflecting degree of the manual control value reflected in the next automatic control, as compared with a case where the difference is smaller than the predetermined level.

8. The vehicle air conditioner according to claim 1, wherein:

when a difference between the manual control value and a basic control value that is stored in the memory portion is larger than a predetermined level, the change portion controls the reflecting degree of the manual control value reflected in the next automatic control at a small degree.

9. The vehicle air conditioner according to claim 1, wherein:

when a difference between the manual control value and a basic control value that is stored in the memory portion is larger than a predetermined level, the change portion controls the reflecting degree of the manual control value reflected in the next automatic control at a substantially constant value.

10. The vehicle air conditioner according to claim 1, wherein:

when the manual control value is at a maximum value or a minimum value in an operation range of the operation portion, the change portion controls the reflecting degree of the manual control value reflected in the next automatic control at a small degree.

11. The vehicle air conditioner according to claim 1, wherein:

when an air amount to be blown into the passenger compartment is smaller than a predetermined amount or when the air amount to be blown into the passenger compartment is smaller than the predetermined amount after the manual operation, the change portion decreases the reflecting degree of the manual control value reflected in the next automatic control.

* * * * *